United States Patent
Lee et al.

(10) Patent No.: US 12,107,688 B2
(45) Date of Patent: Oct. 1, 2024

(54) METHOD AND APPARATUS FOR TRANSMITTING/RECEIVING WIRELESS SIGNAL IN WIRELESS COMMUNICATION SYSTEM

(71) Applicant: LG ELECTRONICS INC., Seoul (KR)

(72) Inventors: Youngdae Lee, Seoul (KR); Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 365 days.

(21) Appl. No.: 17/714,560

(22) Filed: Apr. 6, 2022

(65) Prior Publication Data
US 2022/0329364 A1 Oct. 13, 2022

(30) Foreign Application Priority Data
Apr. 6, 2021 (KR) ........................ 10-2021-0044774

(51) Int. Cl.
- H04L 1/1829 (2023.01)
- H04L 5/00 (2006.01)
- H04W 72/23 (2023.01)

(52) U.S. Cl.
CPC .......... *H04L 1/1861* (2013.01); *H04L 5/0055* (2013.01); *H04W 72/23* (2023.01)

(58) Field of Classification Search
CPC .... H04W 72/23; H04W 76/27; H04L 1/1812; H04L 1/1861; H04L 1/0023; H04L 5/0044; H04L 1/1854; H04L 5/0055; H04L 1/1614; H04L 1/18
See application file for complete search history.

(56) References Cited

U.S. PATENT DOCUMENTS

| | | | | |
|---|---|---|---|---|
| 2020/0344012 | A1* | 10/2020 | Karaki | H04W 72/23 |
| 2022/0322292 | A1* | 10/2022 | Takeda | H04W 72/30 |
| 2023/0354370 | A1* | 11/2023 | Yang | H04W 72/1273 |

FOREIGN PATENT DOCUMENTS

| | | |
|---|---|---|
| KR | 20200014249 | 2/2020 |
| WO | WO2020093016 | 5/2020 |
| WO | WO2020168351 | 8/2020 |

(Continued)

OTHER PUBLICATIONS

Huawei & HiSilicon, "Remaining issues on scheduling and HARQ," R1-1804431, Presented at 3GPP TSG RAN WG1 Meeting #92bis, Sanya, China, April 16-Apr. 20, 2018, 16 pages.

(Continued)

*Primary Examiner* — Mahran Y Abu Roumi
(74) *Attorney, Agent, or Firm* — Fish & Richardson P.C.

(57) ABSTRACT

According to an embodiment of the present disclosure, a user equipment (UE) may receive information regarding a plurality of radio network temporary identifiers (RNTIs); monitor a plurality of physical downlink control channels (PDCCHs) in search space sets based on the plurality of RNTIs; receive a plurality of physical downlink shared channels (PDSCHs) scheduled by the plurality of PDSCHs; and transmit a single hybrid automatic repeat request (HARQ)-acknowledgment (ACK) report for the plurality of PDSCHs, wherein the plurality of PDSCH may include at least one unicast PDSCH in addition to the multicast PDSCHs.

15 Claims, 12 Drawing Sheets

(56) References Cited

FOREIGN PATENT DOCUMENTS

WO     WO2020223195     11/2020

OTHER PUBLICATIONS

LG Electronics, "Summary #4 of PDSCH/PUSCH enhancements (Scheduling/HARQ)," R1-2102080, Presented at 3GPP TSG RAN WG1 #104-e, e-Meeting, Jan. 25-Feb. 5, 2021, 43 pages.
Search Report in Korean Appln. No. 10-2022-7039127, dated Nov. 16, 2022, 15 pages (with English translation).
WILUS Inc., "Remaining Issues on HARQ-ACK multiplexing," R1-1811451, Presented at 3GPP TSG RAN WG1 Meeting #94bis, Chengdu, China, Oct. 8-12, 2018, 8 pages.
CMCC, "Summary#10 on mechanisms to support group scheduling for RRC_CONNECTED UEs for NR MBS," R1-2102171, 3GPP TSG RAN WG1 #104-e e-Meeting, Jan. 25-Feb. 5, 2021, 192 pages.
International Search Report in International Appln. No. PCT/KR2022/004958, Jul. 12, 2022, 9 pages.

\* cited by examiner

METHOD AND APPARATUS FOR TRANSMITTING/RECEIVING WIRELESS SIGNAL IN WIRELESS COMMUNICATION SYSTEM

CROSS-REFERENCE TO RELATED APPLICATIONS

This application claims the benefit of Korean Patent Application No. 10-2021-0044774, filed on Apr. 6, 2021, which is incorporated herein by reference for all purposes as if fully set forth herein.

TECHNICAL FIELD

The present disclosure relates to a wireless communication system, and more particularly, to a method and apparatus for transmitting/receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

In an aspect of the present disclosure, there is provided a method of receiving a signal by a user equipment (UE) in a wireless communication system, the method may comprise: receiving information regarding a plurality of radio network temporary identifiers (RNTIs); monitoring a plurality of physical downlink control channels (PDCCHs) in search space sets based on the plurality of RNTIs; receiving a plurality of physical downlink shared channels (PDSCHs) scheduled by the plurality of PDSCHs; generating a single hybrid automatic repeat request (HARQ)-acknowledgment (ACK) report for the plurality of PDSCHs, and transmitting the single HARQ-ACK report. Based on that i) the plurality of RNTIs include group-RNTIs (G-RNTIs) for multicast, ii) the plurality of PDCCHs include G-RNTI-based PDCCHs for scheduling multicast PDSCHs, iii) downlink control information (DCI) of each G-RNTI-based PDCCH includes downlink assignment index (DAI) for a corresponding multicast PDSCH, iv) the plurality of PDSCH include at least one unicast PDSCH in addition to the multicast PDSCHs, and v) the UE is configured to generate the single HARQ-ACK report based on a type-2 HARQ-ACK codebook, the generation of the single HARQ-ACK report may comprise: a) determining at least one first HARQ-ACK codebook for the at least one unicast PDSCH; b) determining second HARQ-ACK codebooks for the multicast PDSCHs; and c) generating the single HARQ-ACK report by concatenating the at least first HARQ-ACK codebook and the second HARQ-ACK codebooks based on a specific concatenation rule. Based on the specific concatenation rule the at least first HARQ-ACK codebook for the at least one unicast PDSCH may be followed by the second HARQ-ACK codebooks for the multicast PDSCHs, and the second HARQ-ACK codebooks for the multicast PDSCHs may be arranged based on the G-RNTIs.

Preferably, the second HARQ-ACK codebooks for the multicast PDSCHs may be arranged in ascending order of the G-RNTIs.

Preferably, the at least one unicast PDSCH may include a unicast PDSCH carrying a retransmission of a multicast TB.

Preferably, an ACK/Negative-ACK (NACK) bit for the retransmission of the multicast TB may be included in the at least one first HARQ-ACK codebook.

Preferably, based on the single HARQ-ACK report includes Negative-ACK (NACK) for a corresponding multicast PDSCH, the UE may assume that a retransmission of the corresponding multicast PDSCH can be scheduled either a unicast PDCCH or a same G-RNTI-based PDCCH.

Preferably, DAI value counting may be performed per each G-RNTI.

Preferably, a size of the second HARQ-ACK codebooks for the multicast PDSCHs may be determined based on DAIs included in the G-RNTI-based PDCCHs.

Preferably, in a state where a size of the single HARQ-ACK report is limited by a maximum payload size, the at least first HARQ-ACK codebook may be prioritized over all the second HARQ-ACK codebooks.

Preferably, among the second HARQ-ACK codebooks for the multicast PDSCHs, a second HARQ-ACK codebook related to a lower G-RNTI value may be prioritized over a second HARQ-ACK codebook related to a higher G-RNTI value.

In another aspect of the present disclosure, there is provided a computer-readable storage medium having stored thereon a program for executing the above-described method.

In another aspect of the present disclosure, there is provided a UE configured to perform the method.

In another aspect of the present disclosure, there is provided a device configured to control the UE configured to perform the method.

In another aspect of the present disclosure, there is provided a method of transmitting a signal by a base station (BS) in a wireless communication system, the method may comprise: transmitting information regarding a plurality of radio network temporary identifiers (RNTIs); transmitting a plurality of physical downlink control channels (PDCCHs) in search space sets based on the plurality of RNTIs; transmitting a plurality of physical downlink shared channels (PDSCHs) scheduled by the plurality of PDSCHs; and receiving a single hybrid automatic repeat request (HARQ)-acknowledgment (ACK) report for the plurality of PDSCHs. Based on that i) the plurality of RNTIs include group-RNTIs (G-RNTIs) for multicast, ii) the plurality of PDCCHs include G-RNTI-based PDCCHs for scheduling multicast PDSCHs, iii) downlink control information (DCI) of each G-RNTI-based PDCCH includes downlink assignment index (DAI) for a corresponding multicast PDSCH, iv) the plurality of PDSCH include at least one unicast PDSCH in addition to the multicast PDSCHs, and v) the single HARQ-ACK report is configured based on a type-2 HARQ-ACK codebook, the reception of the single HARQ-ACK report may comprise: a) obtaining at least one first HARQ-ACK codebook for the at least one unicast PDSCH; and b) obtaining second HARQ-ACK codebooks for the multicast PDSCHs. The at least first HARQ-ACK codebook and the second HARQ-ACK codebooks may be concatenated based on a specific concatenation rule. Based on the specific concatenation rule, the at least first HARQ-ACK codebook for the at least one unicast PDSCH is followed by the second HARQ-ACK codebooks for the multicast PDSCHs, and the second HARQ-ACK codebooks for the multicast PDSCHs are arranged based on the G-RNTIs.

In another aspect of the present disclosure, there is provided a BS configured to perform the method.

According to an embodiment of the present disclosure, HARQ-ACK reporting for unicast/multicast PDSCHs can be performed, particularly, HARQ-ACK codebooks for unicast/multicast PDSCHs are concatenated based on a specific concatenation rule, thereby HARQ-ACK reporting can be performed efficiently and exactly without increasing signaling overhead for configuring HARQ-ACK report structure.

It will be appreciated by persons skilled in the art that the effects that could be achieved with the present disclosure are not limited to what has been particularly described hereinabove and other advantages of the present disclosure will be more clearly understood from the following detailed description.

DETAILED DESCRIPTION

Figure 1:
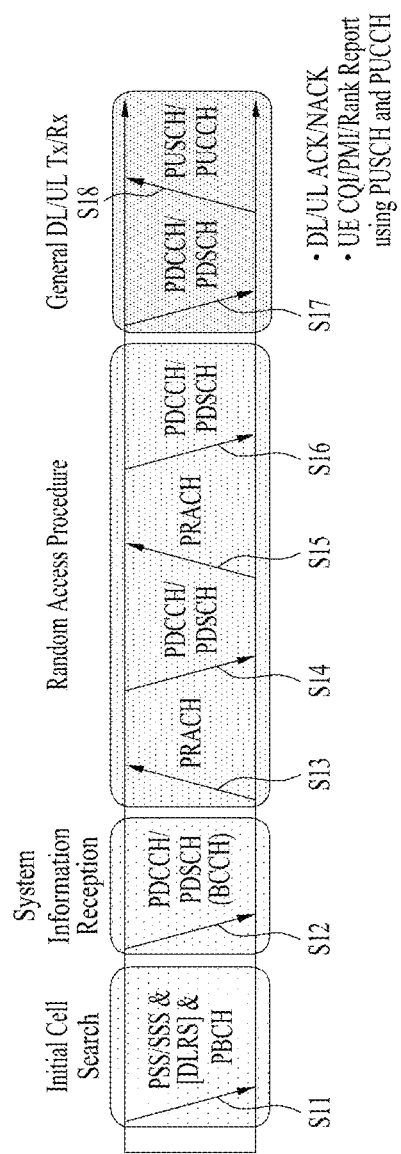
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/user equipments (UEs) sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

Details of the background, terminology, abbreviations, etc. used herein may be found in following documents.

3GPP LTE
  TS 36.211: Physical channels and modulation
  TS 36.212: Multiplexing and channel coding
  TS 36.213: Physical layer procedures
  TS 36.300: Overall description
  TS 36.321: Medium Access Control (MAC)
  TS 36.331: Radio Resource Control (RRC)

3GPP NR
  TS 38.211: Physical channels and modulation
  TS 38.212: Multiplexing and channel coding
  TS 38.213: Physical layer procedures for control
  TS 38.214: Physical layer procedures for data
  TS 38.300: NR and NG-RAN Overall Description
  TS 38.321: Medium Access Control (MAC)
  TS 38.331: Radio Resource Control (RRC) protocol specification Abbreviations and Terms PDCCH: Physical Downlink Control CHannel
PDSCH: Physical Downlink Shared CHannel
PUSCH: Physical Uplink Shared CHannel
CSI: Channel state information
RRM: Radio resource management
RLM: Radio link monitoring
DCI: Downlink Control Information CAP: Channel Access Procedure
Ucell: Unlicensed cell
PCell: Primary Cell
PSCell: Primary SCG Cell
TBS: Transport Block Size
SLIV: Starting and Length Indicator Value
BWP: BandWidth Part
CORESET: COntrol REsourse SET
REG: Resource element group
SFI: Slot Format Indicator
COT: Channel occupancy time
SPS: Semi-persistent scheduling
PLMN ID: Public Land Mobile Network identifier
RACH: Random Access Channel
RAR: Random Access Response
MBMS: Multimedia Broadcast/Multicast Service
Msg3: Message transmitted on UL-SCH containing a C-RNTI MAC CE or CCCH SDU, submitted from upper layer and associated with the UE Contention Resolution Identity, as part of a Random Access procedure.
Special Cell: For Dual Connectivity operation the term Special Cell refers to the PCell of the MCG or the PSCell of the SCG depending on if the MAC entity is associated with the MCG or the SCG, respectively. Otherwise the term Special Cell refers to the PCell. A Special Cell supports PUCCH transmission and contention-based Random Access, and is always activated.
Serving Cell: A PCell, a PSCell, or an SCell
CG: Configured Grant
Type 1 CG or Type 2 CG: Type 1 configured grant or Type 2 configured grant
SPS: Semi-Persistent Scheduling
Fall-back DCI: DCI format can be used for fall-back operation, e.g., DCI format 0_0 and 1_0
non fall-back DCI: DCI format other than fall-back DCI, e.g., DCI format 0_1, 1_1
CORESET: COntrol REsource SET
SS: search space
FDRA: frequency domain resource allocation
TDRA: frequency domain resource allocation
LP, HP: Low(er) priority, High(er) priority
A/N for Cell A: A/N information for data (e.g., PDSCH) received in Cell A
CSI: Channel state information
RI: Rank indication
PMI: Precoding Matrix Indicator
CQI: Channel Quality Indicator
UL CI: Uplink cancelation indication
CAP: channel access procedure
CFR: Common Frequency Resource for MBS. One DL CFR provides group common PDCCH and group common PDSCH transmission resources for MBS. One UL CFR provides a HARQ-ACK PUCCH resource for group common PDSCH. One CFR is related to one MBS specific BWP or one UE specific BWP. One or more CFRs may be configured in one UE specific BWP. One CFR may be associated with one UE specific BWP.
TMGI: Temporary Mobile Group Identity, MBS service identifier indicating a specific service
G-RNTI: Group Radio Network Temporary Identifier, UE group ID that receives MBS In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel line (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
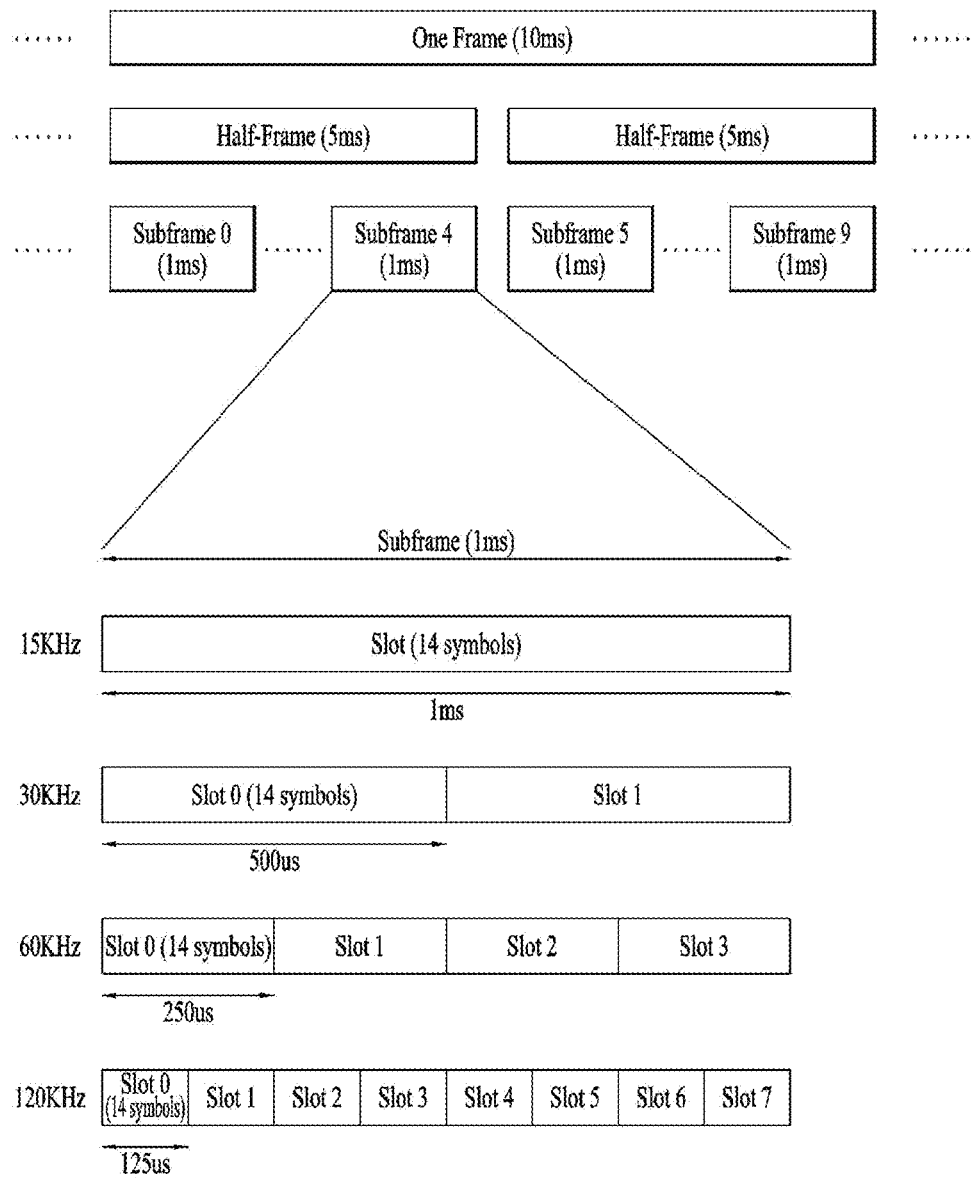
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15 * 2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: Number of symbols in a slot
$N^{frame,u}_{slot}$: Number of slots in a frame
$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
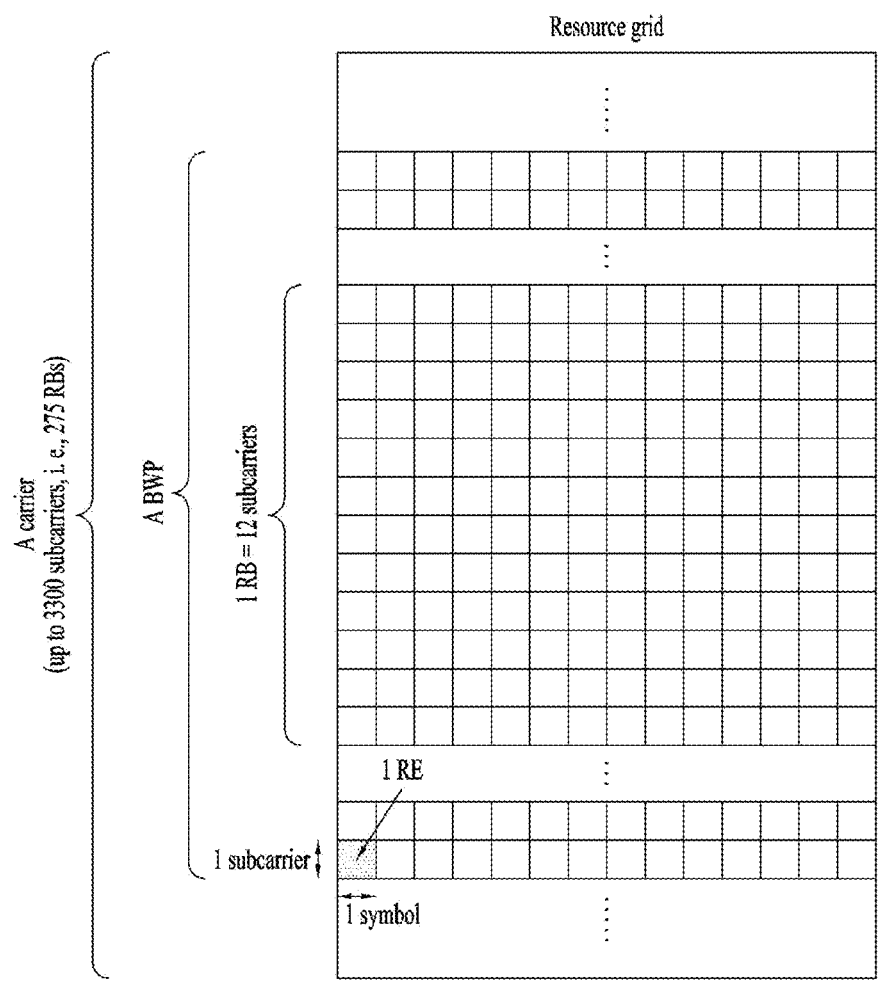
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
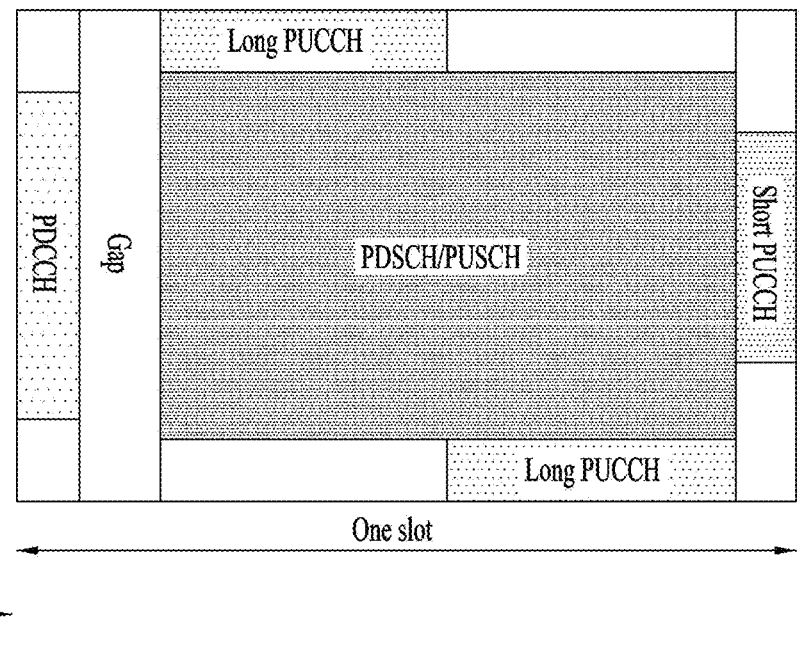
FIG. 4 illustrates exemplary mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g., a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

A BS may transmit a control resource set (CORESET) configuration to a UE. A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

controlResourceSetId: indicates the ID of a CORESET.
frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.
duration: indicates the time resources of the CORESET. Duration indicates the number of consecutive OFDM symbols included in the CORESET. Duration has a value of 1 to 3.
cce-REG-MappingType: indicates a control channel element (CCE)-REG mapping type. Interleaved and non-interleaved types are supported.
interleaverSize: indicates an interleaver size.

pdcch-DMRS-ScramblingID: indicates a value used for PDCCH DMRS initialization. When pdcch-DMRS-ScramblingID is not included, the physical cell ID of a serving cell is used.

precoderGranularity: indicates a precoder granularity in the frequency domain.

reg-BundleSize: indicates an REG bundle size.

tci-PresentInDCI: indicates whether a transmission configuration index (TCI) field is included in DL-related DCI.

tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE. The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.

controlResourceSetId: indicates a CORESET associated with the SS.

monitoringSlotPeriodicityAndOffset: indicates a periodicity (in slots) and offset (in slots) for PDCCH monitoring.

monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.

nrofCandidates: indicates the number of PDCCH candidates (one of values 0, 1, 2, 3, 4, 5, 6, and 8) for each AL where AL={1, 2, 4, 8, 16}.

searchSpaceType: indicates common search space (CSS) or UE-specific search space (USS) as well as a DCI format used in the corresponding SS type.

Subsequently, the BS may generate a PDCCH and transmit the PDCCH to the UE, and the UE may monitor PDCCH candidates in one or more SSs to receive/detect the PDCCH. An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

PDSCH carries downlink data (e.g., DL-SCH transport block, DL-SCH TB). The modulation scheme such as Quadrature Phase Shift Keying (QPSK), 16 Quadrature Amplitude Modulation (QAM), 64 QAM, or 256 QAM is applied to the PDSCH. A codeword is generated by encoding the TB. The PDSCH can carry up to two codewords. Scrambling and modulation mapping are performed for each codeword, and modulation symbols generated from each codeword may be mapped to one or more layers. Each layer is mapped to resources along with a demodulation reference signal (DMRS), is generated as an OFDM symbol signal, and is transmitted through a corresponding antenna port.

PUCCH carries Uplink Control Information (UCI). UCI may include one or more of following information:

SR (Scheduling Request): Information used to request a UL-SCH resource.

HARQ (Hybrid Automatic Repeat reQuest)-ACK (Acknowledgment): It is a response to a downlink data packet (e.g., codeword) on the PDSCH, and indicates whether the downlink data packet has been successfully received. 1 bit of HARQ-ACK may be transmitted in response to a single codeword, and 2 bits of HARQ-ACK may be transmitted in response to two codewords. The HARQ-ACK response includes positive ACK (simply, ACK), negative ACK (NACK), DTX or NACK/DTX. Here, HARQ-ACK may be called as HARQ ACK/NACK and ACK/NACK.

CSI (Channel State Information): feedback information for a downlink channel. Multiple Input Multiple Output (MIMO)-related feedback information includes a Rank Indicator (RI) and a Precoding Matrix Indicator (PMI).

Table 5 shows PUCCH formats. According to PUCCH length, PUCCH formats can be classified as Short PUCCH (format 0, 2) and Long PUCCH (format 1, 3, 4).

TABLE 5

| PUCCH format | Length in OFDM symbols $N^{PUCCH}_{symb}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI having a maximum size of 2 bits, and is mapped and transmitted based on a sequence. Specifically, the UE transmits a specific UCI to the base station by transmitting one of the plurality of sequences through the PUCCH having the PUCCH format 0. The UE transmits a PUCCH format 0 within a PUCCH resource for configuring a corresponding SR only when transmitting a positive SR.

PUCCH format 1 carries UCI with a maximum size of 2 bits, and a modulation symbol is spread by an orthogonal cover code (OCC) (configured differently depending on whether frequency hopping is performed) in the time domain. DMRS is transmitted in a symbol in which a modulation symbol is not transmitted (i.e., time division multiplexing (TDM) is performed).

PUCCH format 2 carries UCI having a bit size greater than 2 bits, and a modulation symbol is transmitted with DMRS based on frequency division multiplexing (FDM). DM-RS is located at symbol indexes #1, #4, #7, and #10 in a given resource block with a density of ⅓. A Pseudo Noise (PN) sequence is used for the DM_RS sequence. For 2-symbol PUCCH format 2, frequency hopping may be enabled.

For PUCCH format 3, UE multiplexing is not performed in the same physical resource blocks, and the PUCCH format 3 carries UCI having a bit size greater than 2 bits. PUCCH resource of PUCCH format 3 does not include an orthogonal cover code. The modulation symbol is transmitted with the DMRS based on time division multiplexing (TDM).

For PUCCH format 4, UE multiplexing is supported for up to 4 UEs in the same physical resource blocks, and the PUCCH format 4 carries UCI having a bit size greater than 2 bits. PUCCH resource of PUCCH format 3 includes an orthogonal cover code. The modulation symbol is transmitted with DMRS based on time division multiplexing (TDM).

PUSCH carries uplink data (e.g., UL-SCH transport block, UL-SCH TB) and/or uplink control information (UCI). PUCCH is transmitted based on a CP-OFDM (Cyclic Prefix-Orthogonal Frequency Division Multiplexing) waveform or a Discrete Fourier Transform-spread-Orthogonal Frequency Division Multiplexing (DFT-s-OFDM) waveform. When the PUSCH is transmitted based on the DFT-s-OFDM waveform, the UE performs transform precoding for the PUSCH. For example, if transform precoding is not performed (e.g., transform precoding is disabled), the UE transmits a PUSCH based on the CP-OFDM waveform. If transform precoding is performed (e.g., transform precoding is enabled), the UE transmits the PUSCH based on a CP-OFDM waveform or a DFT-s-OFDM waveform. PUSCH transmission is dynamically scheduled by a UL grant in DCI (e.g., Layer 1 (PDCCH) signaling), and/or semi-statically scheduled based on higher layer (e.g., RRC) signaling (configured grant). PUSCH transmission may be performed on a codebook-based or non-codebook-based basis.

Figure 5:
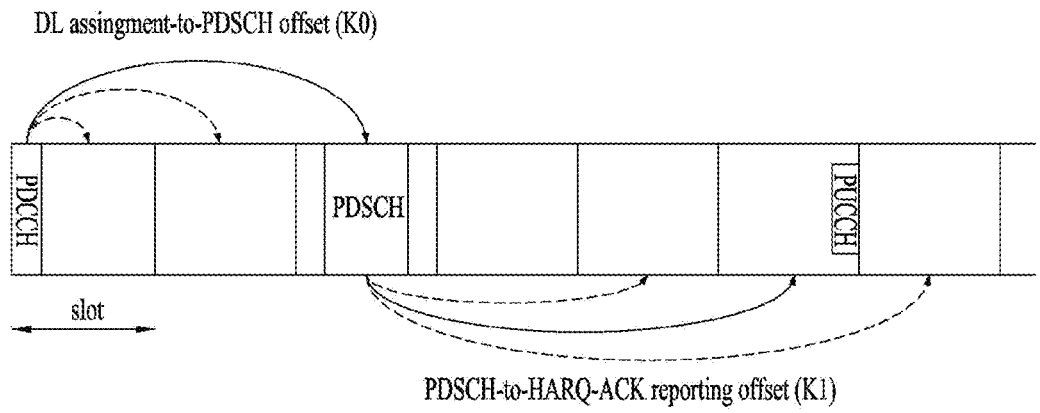
FIG. 5 illustrates an example of a physical downlink shared channel (PDSCH) transmission/reception procedure.

FIG. 5 illustrates an example of a PDSCH transmission/reception procedure. Referring to FIG. 5, the UE may detect the PDCCH in slot #n. Here, the PDCCH includes downlink scheduling information (e.g., DCI formats 1_0, 1_1), and the PDCCH indicates a DL assignment-to-PDSCH offset (K0) and a PDSCH-HARQ-ACK reporting offset (K1). For example, DCI formats 1_0 and 1_1 may include the following information:

Frequency domain resource assignment (FDRA): FDRA indicates the RB set allocated to the PDSCH.

Time domain resource assignment (TDRA): TDRA indicates K0 (e.g., slot offset), the starting position (e.g., OFDM symbol index) of the PDSCH within slot #n+K0, and the length of the PDSCH (e.g., the number of OFDM symbols).

PDSCH-to-HARQ_feedback timing indicator, which indicates K1 (e.g., slot offset)

HARQ process number (4 bits), which indicates the HARQ process ID (Identity) for data (e.g., PDSCH, TB)

PUCCH resource indicator (PRI): PRI indicates a PUCCH resource to be used for UCI transmission among a plurality of PUCCH resources in the PUCCH resource set The UE receives the PDSCH in slot #(n+K0) based on the scheduling information received in slot #n. After completion of the PDSCH reception in slot #n1 (where, n+K0<n1), the UE may transmit UCI through PUCCH from slot #(n1+K1). Here, the UCI may include a HARQ-ACK response for the PDSCH. In FIG. 5, for convenience, it is assumed that the SCS for the PDSCH and the SCS for the PUCCH are the same, and it is assumed that slot #n1=slot #n+K0, but the present disclosure is not limited thereto. If the SCSs are different, K1 may be indicated/interpreted based on the SCS of the PUCCH.

If the PDSCH is configured to carry a maximum of 1 TB, the HARQ-ACK response may have 1-bit. When the PDSCH is configured to carry a maximum of 2 TBs, the HARQ-ACK response may be configured with 2-bits when spatial bundling is not configured, and may be configured with 1-bits when spatial bundling is configured. When the HARQ-ACK transmission time for the plurality of PDSCHs is configured as slot #(n+K1), the UCI transmitted in the slot #(n+K1) includes HARQ-ACK responses for the plurality of PDSCHs.

Whether the UE should perform spatial bundling for the HARQ-ACK response may be configured for each cell group (e.g., RRC/higher layer signaling). As an example, spatial bundling may be individually configured in each of the HARQ-ACK response transmitted through the PUCCH and/or the HARQ-ACK response transmitted through the PUSCH.

Spatial bundling may be supported when the maximum number of TBs (or codewords) that can be received at one time in the corresponding serving cell (or schedulable through 1 DCI) is two (or two or more) (e.g., higher layer parameter maxNrofCodeWordsScheduledByDCI is equal to 2-TB). Meanwhile, a number of layers greater than four may be used for 2-TB transmission, and a maximum of four layers may be used for 1-TB transmission. As a result, when spatial bundling is configured in a corresponding cell group, spatial bundling may be performed on a serving cell that can schedule more than four layers among serving cells in the corresponding cell group. On a corresponding serving cell, a UE desiring to transmit a HARQ-ACK response through spatial bundling may generate a HARQ-ACK response by performing (bit-wise) logical AND operation on ACK/NACK (A/N) bits for a plurality of TBs.

For example, assuming that the UE receives DCI for scheduling 2-TB and receives 2-TB through the PDSCH based on the DCI. If spatial bundling is performed, a single A/N bit may be generated by performing a logical AND operation on the first A/N bit for the first TB and the second A/N bit for the second TB. As a result, if both the first TB and the second TB are ACKs, the UE reports the ACK bit value to the BS, and when either TB is NACK, the UE reports the NACK bit value to the BS.

For example, when only a 1-TB is actually scheduled on a serving cell in which 2-TB reception is allowed, the UE may generate a single A/N bit by performing a logical AND operation on the A/N bit for the corresponding 1-TB and a bit value of 1. As a result, the UE may report the A/N bit for the corresponding 1-TB to the BS as it is.

A plurality of parallel DL HARQ processes can be configured for DL transmission in the base station/terminal. A plurality of parallel HARQ processes allow DL transmissions to be performed continuously while waiting for HARQ feedback on successful or unsuccessful reception of the previous DL transmission. Each HARQ process is associated with a HARQ buffer of a MAC (Medium Access Control) layer. Each DL HARQ process manages information related to the number of MAC PDU (Physical Data Block) transmissions in the buffer, HARQ feedback for the MAC PDU in the buffer, and a current redundancy version. Each HARQ process is identified by a HARQ process ID.

Figure 6:
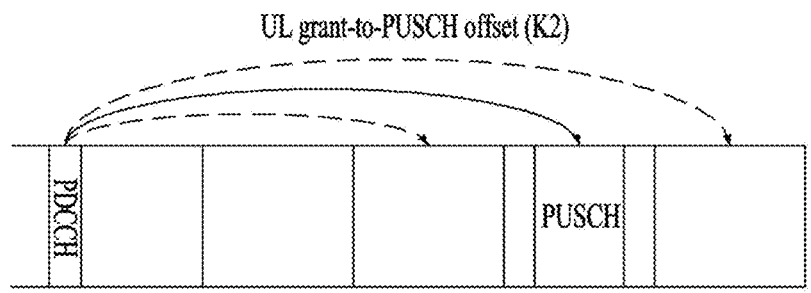
FIG. 6 illustrates an example of a physical uplink shared channel (PUSCH) transmission/reception procedure.

FIG. 6 illustrates an example of a PUSCH transmission/reception procedure. Referring to FIG. 6, the UE may detect the PDCCH in slot #n. Here, the PDCCH includes uplink scheduling information (e.g., DCI formats 0_0, 0_1). DCI formats 0_0 and 0_1 may include the following information:

Frequency domain resource assignment (FDRA), which indicates the RB set allocated to the PUSCH Time domain resource assignment (TDRA), which indicates the slot offset K2, the start position (e.g., symbol index) and length (e.g., number of OFDM symbols) of the PUSCH in the slot. The start symbol and length may be indicated through a Start and Length Indicator Value (SLIV), or may be indicated respectively.

The UE may transmit the PUSCH in slot #(n+K2) according to the scheduling information received in slot #n. The PUSCH may include a UL-SCH TB.

Figure 7:
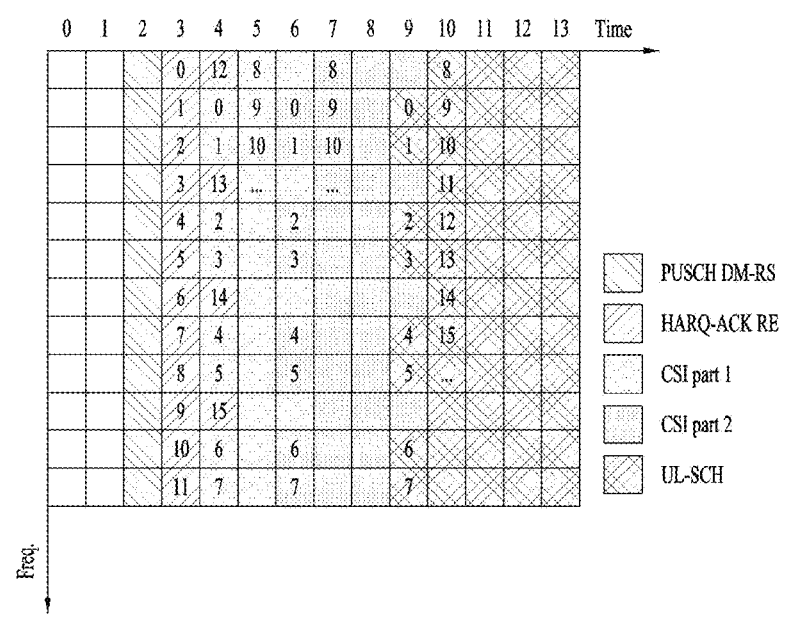
FIG. 7 illustrates an example of multiplexing uplink control information (UCI) with a PUSCH.

FIG. 7 illustrates exemplary multiplexing of UCI in a PUSCH. If a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated.

Multimedia Broadcast/Multicast Service (MBMS)

Hereinafter, MBMS schemes used in 3GPP LTE will be described. 3GPP MBMS may be classified as (i) a single frequency network (SFN) scheme in which a plurality of BS cells are synchronized to transmit the same date on a PMCH, and (ii) a single cell point to multipoint (SC-PTM) scheme in which broadcasting is performed over a PDCCH/PDSCH in the coverage of a corresponding cell. The SFN scheme is used to provide broadcast services over a wide area (e.g., MBMS area) on semi-statically pre-allocated resource(s), whereas the SC-PTM scheme is used to provide broadcast services within a cell coverage on dynamic resource(s).

SC-PTM provides one logical channel, i.e., a single cell multicast control channel (SC-MCCH) and one or more logical channels, i.e., one or more single cell multicast traffic channels (SC-MTCHs). The logical channels are mapped to a transport channel, a DL-SCH, and a physical channel, a PDSCH. The PDSCH carrying SC-MCCH data or SC-MTCH data is scheduled by a PDCCH scrambled with a group RNTI (G-RNTI). In this case, a temporary mobile group identity (TMGI) corresponding to a service ID may be one-to-one mapped to a specific G-RNTI value. Thus, if the BS provides a plurality of services, a plurality of G-RNTI values may be allocated for SC-PTM transmission. One or more UEs may perform PDCCH monitoring based on a specific G-RNTI to receive a specific service. For the specific service/G-RNTI, an SC-PTM dedicated DRX on-duration may be configured. In this case, the UEs may wake up for specific on-duration(s) and perform the PDCCH monitoring based on the G-RNTI.

[HARQ-ACK Information for UE Group Common Dynamic Scheduling]

The above descriptions (3GPP system, frame structure, NR system, etc.) may be applied in combination with the methods proposed in the present disclosure, which will be described later, or used as supplements to clarify the technical features of the methods proposed in the present disclosure. In this document, '/' may mean 'and', or 'and/or' depending on the context.

In the prior art, the BS may configure a UE-dedicated SPS configuration for a specific UE, and may repeatedly allocate DL SPS resources according to a periodicity configured by the UE-dedicated SPS configuration. In this case, the DCI of the UE-dedicated PDCCH may indicate activation of a specific SPS configuration index (SPS activation) to instruct the corresponding UE to repeatedly receive the SPS resource according to the configured periodicity. These SPS resources are used for initial HARQ transmission, and the BS may allocate retransmission resources of a specific SPS configuration index through DCI of the UE-dedicated PDCCH. For example, if the UE reports a NACK for the SPS resource, the BS allocates the retransmission resource to DCI so that the UE can receive the DL retransmission. Meanwhile, the DCI of the UE-dedicated PDCCH may indicate deactivation of a specific SPS configuration index (SPS release or SPS deactivation). In this case, the UE does not receive the indicated SPS resource. Here, the CRC of the DCI for the activation/retransmission/deactivation is scrambled with a CS-RNTI.

REL-17 NR will introduce a DL broadcast or DL multicast transmission method to support a Multicast Broadcast Service (MBS) service similar to LTE MBMS. The BS provides a point-to-multipoint (PTM) transmission method and a point-to-point (PTP) transmission method for DL broadcast or DL multicast transmission. In the PTM transmission method for MBS, the BS transmits group-common PDCCH (GC PDCCH) and group-common PDSCH (GC PDSCH) to a plurality of UEs, and the plurality of UEs may receive the same group-common PDCCH and group-common, and decode the same MBS data received through the GC PDSCH. On the other hand, in the PTP transmission for MBS, the BS transmits the UE-dedicated PDCCH and the UE-dedicated PDSCH to a specific UE, and only the corresponding UE receives the UE-dedicated PDCCH and the UE-dedicated PDSCH. If there are a plurality of UEs receiving the same MBS, the BS separately transmits the same MBS data to individual UEs through different UE-dedicated PDCCHs and UE-dedicated PDSCHs.

Meanwhile, the BS may provide UEs with a plurality of group-common PTM PDSCHs, UE-dedicated PTP PDSCHs, and unicast PDSCHs. In this case, the method of configuring the HARQ-ACK codebook is not clear. In order to solve this problem, various examples for generating HARQ-ACK codebook for a plurality of group-common PTM PDSCHs, UE-dedicated PTP PDSCH(s), and unicast PDSCH(s) are described.

Present disclosure may includes following methods:
Method 1: Interest based HARQ codebook determination
Method 2: Interest based HARQ-ACK information bit determination
Method 3: concatenation of HARQ-ACK sub-codebook for Unicast PDSCH & HARQ-ACK sub-codebook for PTM/PTP MBS PDSCH
Method 4: PUCCH resource allocation Hereafter, various examples for the BS to dynamically transmit UE-group PDCCH/PDSCH to one or more UEs, is described.

Figure 8:
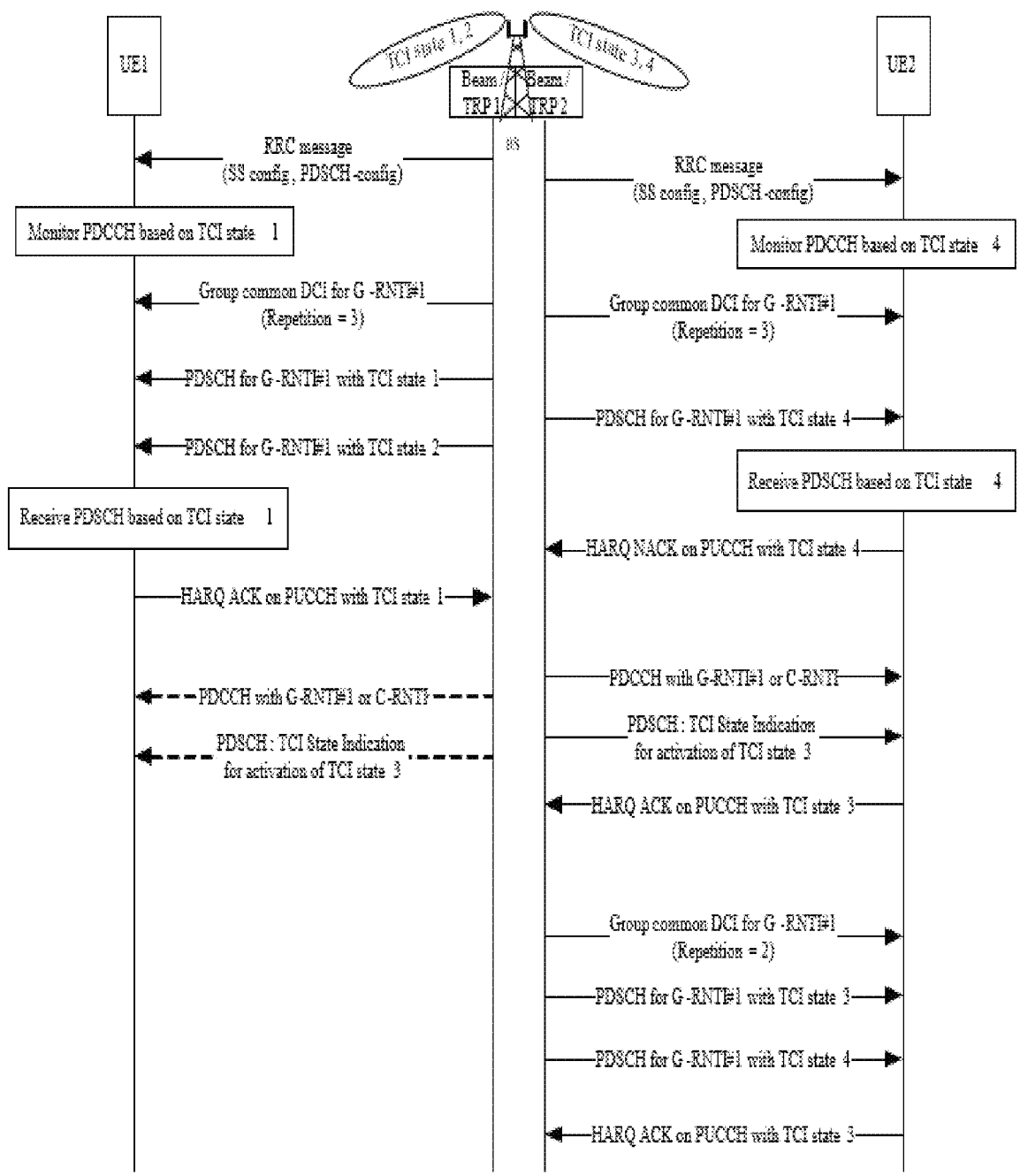
FIG. 8 illustrates Activation and retransmission of group common SPS configuration according to an embodiment of the present disclosure.

FIG. 8 illustrates Activation and retransmission of group common SPS configuration according to an embodiment of the present disclosure.

Referring to FIG. 8, UE enters RRC_CONNECTED mode and reports a message indicating one or more interested MBS services to BS.

A. The message is carried over one of UCI (Uplink Control Information), MAC CE (Control Element) and RRC message.

B. The interested MBS service in the message refers to one of TMGIs or one of G-RNTIs listed in a DL message received from BS.

For example, the DL message is a service availability message listing TMGI #1, TMGI #3, TMGI #5 and TMGI #10. If UE is interested in TMGI #5, UE indicates the order of TMGI #5 in the message, i.e. UE reports '3' to the BS For example, the DL message is a service availability message listing G-RNTI #1, G-RNTI #3, G-RNTI #5 and G-RNTI #10. If UE is interested in G-RNTI #10, UE indicates the order of G-RNTI #10 in the message, i.e. UE reports '4' to the BS.

2. Upon receiving the message, BS provides CFR configuration, one or more group common PDSCH configurations including TCI states for one or more G-RNTI values, search space configuration including TCI states for one or more G-RNTI value(s) to the UE by a RRC message. Upon receiving the RRC message, UE configures one or more group common SPS configurations according to the RRC message.

A. The RRC message can be group common message transmitted on PTM MCCH (Multicast Control Channel) or UE dedicated message transmitted on UE specific DCCH (Dedicated Control Channel)

B. UE is configured at least with a G-RNTI value for each MBS CFR (common frequency resource) or each serving cell. GC-CS-RNTI can be also configured and used for activation, retransmission or release of one or more group common SPS configurations.

If UE is not configured with a GC-CS-RNTI for a CFR or a seriving cell, UE uses CS-RNTI for activation, retransmission or release of one or more group common SPS configurations, if CS-RNTI has been configured for the CFR or the serving cell.

BS can associate a list of TMGIs or a list of G-RNTIs to one GC-CS-RNTI value. In this case, BS provides the list of TMGIs or the list of G-RNTIs which is associated to the GC-CS-RNTI value.

C. Each PDSCH configuration (i.e. PDSCH-config) consists of at least the following information elements for multicast and/or broadcast:

TABLE 6

```
PDSCH-Config ::= SEQUENCE {
dataScramblingIdentityPDSCH INTEGER (0..1023) OPTIONAL, -- Need S
dmrs-DownlinkForPDSCH-MappingTypeA SetupRelease { DMRS-DownlinkConfig } OPTIONAL, -- Need M
dmrs-DownlinkForPDSCH-MappingTypeB SetupRelease { DMRS-DownlinkConfig } OPTIONAL, -- Need M
tci-StatesToAddModList SEQUENCE (SIZE(1..maxNrofTCI-States)) OF TCI-State OPTIONAL, -- Need N
tci-StatesToReleaseList SEQUENCE (SIZE(1..maxNrofTCI-States)) OF TCI-StateId OPTIONAL, -- Need N
vrb-ToPRB-Interleaver ENUMERATED (n2, n4) OPTIONAL, -- Need S
resourceAllocation ENUMERATED { resourceAllocationType0, resourceAllocationType1, dynamicSwitch},
pdsch-TimeDomainAllocationList SetupRelease { PDSCH-TimeDomainResourceAllocationList } OPTIONAL, -- Need M
pdsch-AggregationFactor ENUMERATED { n2, n4, n8 } OPTIONAL, -- Need S
rateMatchPatternToAddModList SEQUENCE (SIZE (1..maxNrofRateMatchPatterns)) OF RateMatchPattern OPTIONAL, --
Need N
rateMatchPatternToReleaseList SEQUENCE (SIZE (1..maxNrofRateMatchPatterns)) OF RateMatchPatternId OPTIONAL, --
Need N
rateMatchPatternGroup1 RateMatchPatternGroup OPTIONAL, -- Need R
```

TABLE 6-continued

```
rateMatchPatternGroup2 RateMatchPatternGroup OPTIONAL, -- Need R
rbg-Size ENUMERATED {config1, config2},
mcs-Table ENUMERATED {qam256, qam64LowSE} OPTIONAL, -- Need S
maxNrofCodeWordsScheduledByDCI ENUMERATED {n1, n2}
...}
```

One or more TMGIs are configured and associated with tci-StatesToAddModList. If PDSCH transmission is mapped to a TMGI associated with tci-StatesToAddModList, the PDSCH transmission is associated with the tci-StatesToAddModList One or more G-RNTIs are configured and associated with tci-StatesToAddModList. If PDSCH transmission is mapped to a MBS service of the G-RNTI associated with tci-StatesToAddModList, the PDSCH transmission is associated with the tci-StatesToAddModList.

A value of GC-CS-RNTI or CS-RNTI is configured and associated with tci-StatesToAddModList. If a PDSCH transmission is mapped to the value of GC-CS-RNTI or CS-RNTI associated with tci-StatesToAddModList, the PDSCH transmission is associated with the tci-StatesToAddModList One or more HARQ Process IDs are associated with tci-StatesToAddModList. If PDSCH transmission is mapped to HARQ Process ID associated with tci-StatesToAddModList, the PDSCH transmission is associated with the tci-StatesToAddModList.

3. If a search space has been configured for the configured CFR, UE monitors PDCCH on the configured SS (search space) in the configured CFR to receive DCI of which CRC is scrambled with G-RNTI or GC-CS-RNTI.

A. For the configured SS, UE determines the TCI state(s) of PDCCH DM-RS to monitor PDCCH on CORESET addressed by a CORESET ID on the configured SS as follows:

Option 3A: UE determines one or more TCI states in TCI state list configured by the RRC message for the configured SS and/or G-RNTI(s)/TMGI(s) which UE is interested to receive. If only one TCI state is configured on the CORESET by TCI state list, UE in RRC_CONNECTED monitors PDCCH on CORESET of the configured SS with the TCI state configured for the CORESET ID of the CORESET by the RRC message.

Option 3B: UE determines one or more TCI states indicated by UE specific MAC CE among all TCI states configured by the RRC message. UE in RRC_CONNECTED monitors PDCCH on CORESET of the configured SS with the TCI state indicated for the CORESET ID of the CORESET in 'TCI State Indication for UE-specific MAC CE' among TCI state list associated to G-RNTI(s)/TMGI(s) which UE is interested to receive as described above or TCI state list in CORESET configuration of the CORESET ID for the CFR or this UE.

The Serving Cell ID of 'TCI State Indication for UE-specific MAC CE' shown below indicates the identity of the Serving Cell for which the MAC CE applies. The Serving Cell ID corresponds to the serving cell associated to the CFR or the serving cell of UE's active BWP associated to the CFR. The Serving Cell ID field can be replaced by CFR ID of the CFR. For indication to the TCI state of group common PDCCH with GC-CS-RNTI/CS-RNTI, the Serving Cell ID field can be replaced by G-RNTI configured by the RRC message.

Figure 9:
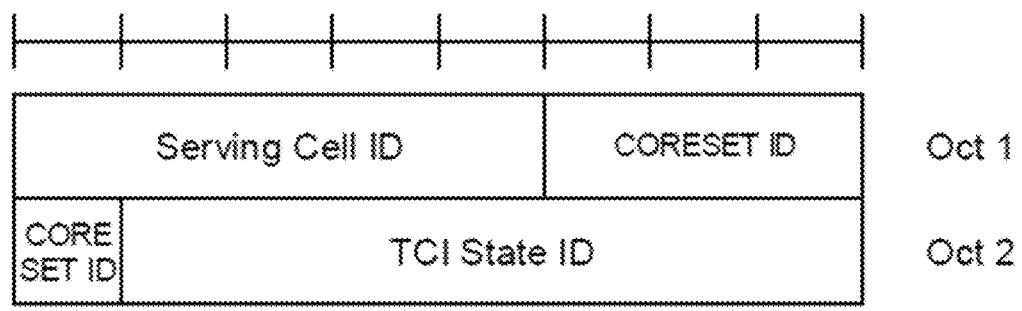
FIG. 9 illustrates TCI State Indication for UE-specific MAC CE.

FIG. 9 illustrates TCI State Indication for UE-specific MAC CE.

Option 3C: UE determines one or more TCI states indicated by group common MAC CE among all TCI states configured by the RRC message. UE in RRC_CONNECTED monitors PDCCH on CORESET of the configured SS with the TCI state indicated for the CORESET ID of the CORESET in 'TCI State Indication for Group Common MAC CE' among tci-StatesToAddModList associated to the G-RNTI/TMGI as described above or TCI state list in CORESET configuration of the CORESET ID for the CFR or this UE.

PDSCH carrying a group common MAC CE such as 'TCI State Indication for Group Common MAC CE' is scheduled by DCI of which CRC is scrambled by G-RNTI or GC-CS-RNTI or CS-RNTI.

If PDSCH carrying the group common MAC CE is scheduled by DCI of which CRC is scrambled by G-RNTI, UE considers that the group common MAC CE applies to group common DCI reception with G-RNTI or UE specific DCI reception associated to G-RNTI (e.g. PTP retransmission for G-RNTI) or SPS (re)activation DCI associated to G-RNTI or SPS retransmission DCI associated to G-RNTI. For example, If PDSCH carrying 'TCI State Indication for Group Common MAC CE' is scheduled by DCI of which CRC is scrambled by G-RNTI, UE considers the TCI state indicated by the MAC CE is applied to group common DCI reception with ti G-RNTI or SPS retransmission DCI associated to G-RNTI.

Figure 10A:
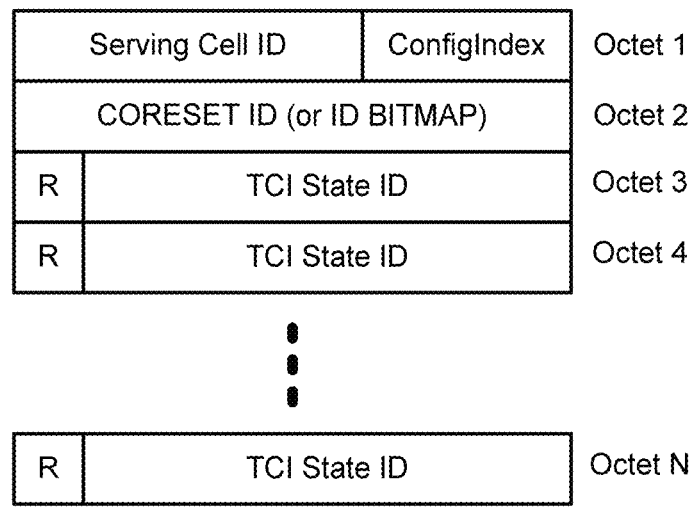
FIGS. 10A and 10B illustrate MAC CE formats for 'TCI State Indication for Group Common MAC CE'.
Figure 10B:
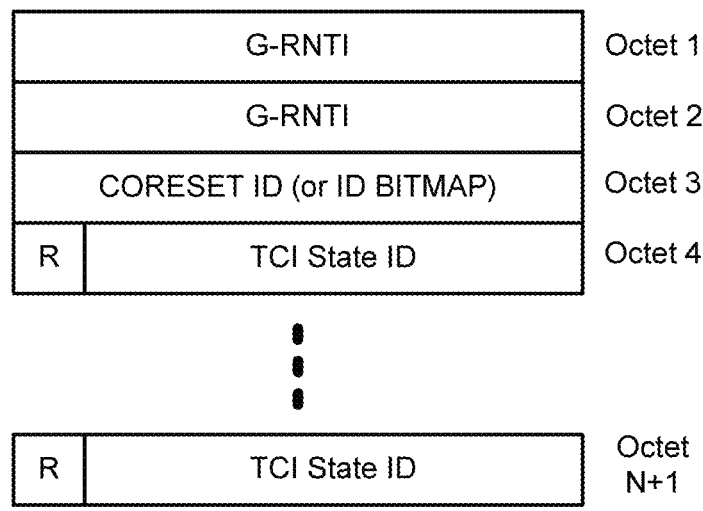

Two options of MAC CE formats for 'TCI State Indication for Group Common MAC CE' are shown in FIGS. 10A and 10B. The Serving Cell ID field in the MAC CE indicates the identity of the Serving Cell for which the MAC CE applies. The Serving Cell ID corresponds to the serving cell associated to the CFR or the serving cell of UE's active BWP associated to the CFR. ConfigIndex field indicates CFR ID of the CFR or short ID of TMGI configured by the RRC message.

If CORESET ID field is included in 'TCI State Indication for Group Common MAC CE', up to N–2 TCI State ID fields can be added to indicate one or more TCI states activated for the CORESET of the CORESET ID either for the Serving Cell ID and ConfigIndex field or for the G-RNTI field.

Alternatively, instead of CORESET ID field, CORESET ID BITMAP field indicates 8 CORESET IDs, i.e. CORESET ID=0, 1, 2, ... and 7. Each bit of CORESET ID BITMAP field indicates whether the TCI state ID of the corresponding CORESET ID configured for the configured SS is added in this MAC CE. If CORESET ID BITMAP field is not included in this MAC CE. 8 TCI state ID fields are included in this MAC CE for 8 CORESET IDs in the increasing order of CORESET ID. If the Serving Cell ID field and the ConfigIndex field are included, each TCI state ID indicates the TCI state for the CORESET ID for the Serving Cell ID field and the ConfigIndex field. If G-RNTI field is included, each TCI state ID indicates the TCI state for the CORESET ID for the G-RNTI in the increasing order of CORESET ID. The G-RNTI field can be replaced by TMGI field. In this case, each TCI state ID indicates the TCI state for the CORESET ID for TMGI in the increasing order of CORESET ID.

FIGS. 10A and 10B: TCI State Indication for Group Common MAC CE

B. UE receives PDCCH on CORESET addressed by a CORESET ID on the configured SS with the determined TCI state determined for the CORESET ID as follows:

If only one TCI state is determined to monitor PDCCH with G-RNTI, UE receives PDCCH with the determined TCI state.

If more than one TCI state is determined to monitor PDCCH with G-RNTI, UE select one or more TCI states to receives PDCCH as follows:
1). UE autonomously selects only one TCI state or a few TCI states among the determined TCI states.
2). UE selects one TCI state with the lowest (or highest) TCI State ID among the determined TCI states.
3). UE selects all determined TCI states.
4). UE selects only one or more determined TCI states corresponding to the TCI state(s) that has selected for UE specific PDCCH with C-RNTI or other RNTI 1). Option 3-1: same value of IDs are mapped, i.e. TCI state ID #k is mapped to CORESET ID #k within a duration (k=0, 1, 2 . . . )
2). Option 3-2: kth TCI state ID in the increasing order of TCI state IDs is mapped to kth CORESET ID in the increasing order of CORESET IDs within a duration (k=1, 2 . . . )
3). Option 3-3: mapping between TCI state IDs and CORESET IDs is configured by the RRC message or UE specific MAC CE or group common MAC CE.

After mapping different TCI states to different CORESETs of same or different CORESET IDs, UE receives one or more CORESETs mapped to the selected TCI state(s) to monitor PDCCH for GC-CS-RNTI, CS-RNTI or G-RNTI.

4. If a data unit is available on a MTCH of a MRB for a MBS service, BS constructs and transmits a TB including the data unit for a SPS PDSCH occasion associated to the MTCH of the MRB for the MBS service, or associated to TMGI of the MBS service, or associated to a short ID of the MBS service, or associated to G-RNTI mapped to the MBS service, according to the service-to-resource mapping.

For group common dynamic scheduling of the TB, BS transmits DCI on PDCCH to UE. CRC of the DCI is scrambled by G-RNTI or GC-CS-RNTI or CS-RNTI. The PDCCH is group common PDCCH or UE specific PDCCH.

The DCI includes the following fields.

TABLE 7

Identifier for DCI formats: This field may indicate MBS specific DCI format or one of the existing DCI format for MBS
Carrier indicator: This field indicates either the (serving or MBS specific) cell of the CFR or the serving cell of the UE's active BWP associated to the CFR where group common PDCCH/PDSCH is transmitted.
Bandwidth part indicator: This field indicates either the BWP ID assigned to the CFR or the BWP ID of the UE's active BWP associated to the CFR where group common PDCCH/PDSCH is transmitted.
Frequency domain resource assignment
Time domain resource assignment
VRB-to-PRB mapping
PRB bundling size indicator
Rate matching indicator
ZP CSI-RS trigger
Modulation and coding scheme
New data indicator (NDI)
Redundancy version
HARQ process number
Downlink assignment index
TPC command for scheduled PUCCH
PUCCH resource indicator
PDSCH-to-HARQ_feedback timing indicator
Antenna port(s)
Transmission configuration indication
SRS request
DMRS sequence initialization
Priority indicator 5). UE selects only one or more determined TCI states of RS(s) of which measured quality is above a threshold set by BS.
6). UE selects only one determined TCI state of RS of which measured quality is best among all determined TCI states.

If multiple CORETSETs are configured for same or different CORESET IDs on the configured SS, UE may select one or multiple different TCI states. If multiple different TCI states are selected for multiple CORESETs for same or different CORESET IDs, UE maps different TCI states to different CORESETs of same or different CORESET IDs as follows:

For group common dynamic scheduling, BS provides one or more of the following service-to-resource mappings for a MBS service identified by a TMGI or a G-RNTI or a GC-CS-RNTI to UE by group common or UE specific RRC message or by group common or UE specific MAC CE. Data of the MBS service is carried on a MBS radio bearer (MRB) of a multicast traffic logical channel, i.e. MTCH associated to the MBS service. The RRC message can be group common message transmitted on PTM MCCH (Multicast Control Channel) or UE dedicated message transmitted on UE specific DCCH (Dedicated Control Channel) The DCI scheduling PDSCH carrying the MBS service data may also indicate one or more of a short ID, a MTCH ID, a MRB ID, a G-RNTI value and a TMGI value for the MBS service.

5. For reception of PDCCH scheduling Nth HARQ transmission of the TB, UE selects a TCI state for group common PDCCH as follows:

Option 5-1: UE selects the TCI state configured by UE specific RRC reconfiguration (typically for FR1)
1). BS does not provide mapping between all CORESETs and all TCI states for G-RNTI
2). Upon receiving UE specific RRC reconfiguration, UE monitors the reconfigured MO or CORESET at least for multicast service according to the TCI state configured by UE specific RRC reconfiguration.

Option 5-2: UE selectively monitors one or more of MOs (Monitoring Occasions) and CORESET(s) associated to the selected TCI state (for FR2)
1). BS provides UE with mapping between all CORESETs and all TCI states for G-RNTI by RRC
2). Multiple CORESET/SSs or different MOs are configured for different TCI states
3). UE autonomously selects MO or CORESET based on the selected TCI state at least for broadcast service
4). Note that idle/inactive UEs already support Option 2 for broadcast.

Option 5-3: BS informs UE about mapping between G-RNTI and TCI state. Then, UE selects G-RNTI among multiple G-RNTIs mapped to same TB based on the selected TCI state
1). Different G-RNTIs are mapped to different TCI states 6. Upon receiving the DCI of which CRC is scrambled by G-RNTI which UE is interested to receive, UE determines MBS service(s) associated to one or more of a short ID, a MTCH ID, a MRB ID, a G-RNTI value and a TMGI value for each of the PDSCH occasions, based on mapping between MBS services and HPNs (HARQ Process Numbers) indicated in the DCI, and/or mapping between MBS services and, if available, short ID(s) indicated in the DCI.

Then, if UE is interested in the determined MBS service(s), UE receives PDSCH transmission scheduled by the DCI. If UE is not interested in the determined MBS service(s), UE does not receive PDSCH transmission scheduled by the DCI. Depending on the decoding status of PDSCH transmission, UE sends HARQ feedback to BS.

7. BS may set tci-PresentInDCI to 'enabled' or configure tci-PresentDCI-1-2 for a CORESET for group common PDCCH.

tci-PresentInDCI: This field indicates if TCI field is present or absent in DCI format 1_1. When the field is absent the UE considers the TCI to be absent/disabled. In case of cross carrier scheduling, the network sets this field to enabled for the ControlResourceSet used for cross carrier scheduling in the scheduling cell (see TS 38.214 [19], clause 5.1.5).

tci-PresentDCI-1-2: Configures the number of bits for "Transmission configuration indicator" in DCI format 1_2. When the field is absent the UE applies the value of 0 bit for the "Transmission configuration indicator" in DCI format 1_2 (see TS 38.212, clause 7.3.1 and TS 38.214, clause 5.1.5)

8. If tci-PresentInDCI is set to 'enabled' or tci-PresentDCI-1-2 is configured for the CORESET scheduling the group common PDSCH, and the time offset between the reception of the DL DCI and the corresponding PDSCH is equal to or greater than timeDurationForQCL if applicable, after a UE receives an initial higher layer configuration of TCI states and before reception of the activation command i.e. TCI State Indication for Group Common MAC CE or for UE specific MAC CE which activates a TCI state, Option 7-1: the UE assumes that the TCI state or the QCL assumption for the group common PDSCH is identical to the TCI state or QCL assumption whichever is applied for the CORESET used for the group common PDCCH transmission within the CFR.

Option 7-2: If default TCI state is configured by RRC, the UE assumes that the TCI state or the QCL assumption for the group common PDSCH is identical to the default TCI state.

Option 7-3: the UE may assume that the DM-RS ports of group common PDSCH of the CFR are quasi co-located with the SS/PBCH block determined in the previous RACH (e.g. during initial access) with respect to qcl-Type set to 'typeA', and when applicable, also with respect to qcl-Type set to 'typeD'.

If the group common PDSCH is scheduled by a DCI format not having the TCI field present, and the time offset between the reception of the DL DCI and the corresponding PDSCH of the CFR is equal to or greater than a threshold timeDurationForQCL if applicable for determining PDSCH antenna port quasi co-location, the UE assumes that the TCI state or the QCL assumption for the group common PDSCH is identical to the TCI state or QCL assumption whichever is applied for the CORESET used for the group common PDCCH transmission within the CFR.

The threshold timeDurationForQCL is based on UE's own UE capability reported to BS, The threshold timeDurationForQCL is based on the lowest UE capability that can be reported to BS or configured for the CFR by BS The threshold timeDurationForQCL is based on the threshold configured by BS.

Independent of the configuration of tci-PresentInDCI and tci-PresentDCI-1-2, regardless of whether PDCCH/PDSCH is group common or UE specific, if the offset between the reception of the DL DCI and the corresponding PDSCH is less than the threshold timeDurationForQCL, the UE assumes that the TCI state or the QCL assumption for PDSCH is identical to the TCI state or QCL assumption whichever is applied for the CORESET used for PDCCH transmission for a CFR, a BWP or a cell. In this case, the threshold timeDurationForQCL is determined as follows:

The threshold timeDurationForQCL is based on UE's own UE capability reported to BS, The threshold timeDurationForQCL is based on the lowest UE capability that can be reported to BS or configured for the CFR, the BWP or the cell by BS The threshold timeDurationForQCL is based on the threshold configured by BS.

9. If the pdsch-AggregationFactor is configured, the TB scheduled by group common DCI can be repeated for Nth HARQ transmission of a TB within each symbol allocation among each of the pdsch-AggregationFactor consecutive slots, if configured.

In this case, same or different TCI states can be configured for different slots of the repetition. Group common/UE specific MAC CE can be used to activate/deactivate TCI states or reconfigure mapping between TCI states and repetitions.

If group common DCI can indicate the number of repetitions for PDSCH for Nth HARQ transmission of a TB, same or different TCI states can be configured for different slots of the repetition. The DCI can be used to activate/deactivate TCI states or reconfigure mapping between TCI states and repetitions.

For dynamic scheduling, the DCI schedules initial transmission or retransmission of group common PDSCH transmission(s).

For semi-persistent scheduling, the DCI (de-)activates a group common SPS configuration or schedules retransmission of group common PDSCH transmission(s).

BS informs UE about mapping between a PDSCH transmission occasion and a TCI state by RRC message or Group common MAC CE or UE specific MAC CE.

1). Option 1: Different HARQ Process IDs are mapped to different TCI states
   (a). For example, DCI indicating HPN #1 schedules PDSCH for TCI state ID #1 while DCI indicating HPN #2 schedules PDSCH for TCI state ID #2.
2). Option 2: Different repetitions of PDSCH transmission are mapped to different TCI states for Nth HARQ transmission
   (a) For example, the first PDSCH repetition and the second PDSCH repetition of a TB scheduled by one DCI indicating 2 repetitions are transmitted with different TCI states.
3). Option 3: Different PDSCH occasions are mapped to different TCI states
   (a). For example, TCI state ID #1 is used for group common PDSCH transmissions in SFN mod M=1 while TCI state ID #2 is used for group common PDSCH transmissions in SFN mod M=2
   (b) For example, different PDSCH transmissions in different slots are mapped to different TCI states. Different PDSCH transmissions in a same slot are mapped to same TCI state.

UE selects TCI state for group common PDSCH scheduled by group common DCI according to the above mapping between PDSCH transmission occasions and TCI states.

10. If decoding the TB on the PDSCH transmission occasion is unsuccessful, UE sends NACK to BS on a PUCCH resource in the configured UL CFR according to PUCCH configuration received by the RRC message, and PUCCH resource indicator and PDSCH-to-HARQ_feedback timing indicator received by the retransmission DCI. The PUCCH is transmitted with the TCI state that is indicated by the DCI, or equal to the TCI state of the CORESET where the DCI was received, or equal to the TCI state of the PDSCH transmission.

The UE may generate a HARQ-ACK codebook for ACK/NACK transmission as follows.

Method 1: Interest Based Ham) Codebook Determination
A. UE may not need to send HARQ-ACK feedback to all multicast transmissions because UE is typically interested in only a few services. UE's interest can be considered for design of HARQ-ACK codebook.
B. For Type-1 HARQ-ACK codebook,
   Option 1A-1: UE constructs Type-1 HARQ-ACK codebook based on TDRA for each DCI format for all group common PDCCH/PDSCH transmissions in a CFR.
   1). HARQ-ACK codebook is not based on whether UE is interested to receive a G-RNTI used for group common PDCCH/PDSCH transmission
   Option 1A-2: UE constructs Type-1 HARQ-ACK codebook based on TDRA for one or more G-RNTIs which UE is interested to receive (i.e. based on UE's interest)
   1). HARQ-ACK codebook is based on whether UE is interested to receive a G-RNTI used for group common PDCCH/PDSCH transmission. G-RNTI(s) which UE is not interested to receive is excluded in construction of Type-1 HARQ-ACK codebook.
C. For Type-2 HARQ-ACK codebook
   Option 1B-1: UE constructs Type-2 HARQ-ACK codebook based on DAI for all group common PDCCH/PDSCH transmissions in a CFR
   1). HARQ-ACK codebook is not based on whether UE is interested to receive a G-RNTI used for group common PDCCH/PDSCH transmission
   Option 1B-2: UE constructs Type-2 HARQ-ACK codebook based on DAI only for DCIS with one or more G-RNTIs which UE is interested to receive (i.e. based on UE's interest)
   1). HARQ-ACK codebook is based on whether UE is interested to receive a G-RNTI used for group common PDCCH/PDSCH transmission. G-RNTI(s) which UE is not interested to receive is excluded in construction of Type-1 HARQ-ACK codebook.
   Option 1B-3: UE constructs Type-2 HARQ-ACK codebook based on DAI only for DCIS enabling HARQ-ACK feedback with one or more G-RNTIs which UE is interested to receive (i.e. based on UE's interest)
   1). For DCI disabling HARQ-ACK feedback, a specific value of DAI indicates disabling HARQ feedback. The DCI with the other DAI value is considered as the DCI enabling HARQ-ACK feedback.
      (a). Alternatively, the DCI indicating DAI is considered as the DCI enabling HARQ-ACK feedback, while the DCI not indicating DAI is considered as the DCI disabling HARQ-ACK feedback.
   2). HARQ-ACK codebook is based on whether UE is interested to receive a G-RNTI used for group common PDCCH/PDSCH transmission and whether HARQ-ACK feedback is enabled for group common PDCCH/PDSCH transmission. G-RNTI(s) which UE is not interested to receive is excluded in construction of Type-1 HARQ-ACK codebook. Group common PDCCH/PDSCH transmission for which HARQ-ACK feedback is disabled is excluded in construction of Type-1 HARQ-ACK codebook.
D. For Type 3 HARQ-ACK codebook,
   HPN numbers indicated by DCI are split by MBS and unicast for each BWP or each cell. One common Type 3 codebook is constructed for both MBS and unicast based on shared HPN.
   1). For example, HPN for unicast can be set to one of 0, 1, . . . and 4 for DCIs with C-RNTI. HPN for MBS can be set to one of 5, 6, 7 and 8 for DCIs with C-RNTI (i.e. PTP) or one of 0, 1, 2, and 3 for DCI for G-RNTI (i.e. PTM).
   2). HARQ-ACK information bits for HPNs of unicast PDSCH are ordered and then HARQ-ACK information bits for HPNs of MBS PDSCH are ordered.

(a). HPN(s) configured for which HARQ-ACK feedback is disabled is excluded in HARQ-ACK information bits for HPNs of MBS PDSCH.
(b). HPN(s) configured for MBS service(s) which UE is not interested to receive is excluded in HARQ-ACK information bits for HPNs of MBS PDSCH.
3). Examples of HPNs for each Cell/BWP providing both MBS and unicast
(a). UE determines Type 3 codebook based on UE specific HPN E.g. 8 for unicast and 4 for MBS for a serving cell providing CFR
i. HARQ-ACK information bits are constructed based on one of the following orders upon PTM/PTP MBS PDSCH reception and Unicast PDSCH reception
① HPN numbers including PTP HPN numbers for unicast DCIs with C-RNTI+HPN numbers for group common DCIs with G-RNTI
② HPN numbers for Unicast DCIs with C-RNTI+HPN numbers for group common DCI with G-RNTI+HPN numbers for PTP specific DCI with C-RNTI (i.e. DCI having explicit indication to MBS with C-RNTI)
③ HPN numbers for group common DCI with G-RNTI+HPN numbers for PTP specific DCI with C-RNTI+HPN numbers for Unicast DCIs with C-RNTI
④ HPN numbers for DCIs with G-RNTI+HPN numbers for Unicast DCI with C-RNTI including PTP HPN numbers Method 2: Interest Based Harq-ACK Information Bit Determination
E. Option 2-1: The number of HARQ-ACK information bits, M, is semi-statically (re-)configured for determining HARQ (sub-)codebook in CFR.
In this option, UE sends M HARQ-ACK information bits regardless of how many group common PDSCH transmissions UE is interested to receive
N MSB or LSB of the HARQ-ACK information bits are set to decoding status (i.e. ACK or NACK) for group common PDSCH transmissions that UE is interested to receive based on TMGI/G-RNTIs associated to the transmissions.
Other HARQ-ACK information bits for group common PDSCH transmissions that UE is not interested to receive are set to all 'NACK' i.e. for non-interested TMGI/G-RNTIs
F. Option 2-2: The number of HARQ-ACK information bits, M, are dynamically changed for determining HARQ (sub-)codebook in a CFR depending on an interest indication reported by UE
When UE becomes interested to receive a MBS service or when UE becomes uninterested to receive a MBS service, UE reports an interest indication to BS.
1). The interest indication is one of a RRC message, MAC CE or UCI.
2). The interest indication reports a list of one or more interested MBS services indicated by TMGI(s) which is associated to G-RNTI(s).
For HARQ-ACK information,
1). 2-2A: The Interest indication reported by UE is immediately reflected for determining HARQ codebook.
(a) The number of HARQ-ACK information bits is determined based on the interest indication indicated by UE
i. For example, one HARQ-ACK information bit is determined for DCI with an G-RNTI of an interested TMGI(s)
ii. For example, K HARQ-ACK information bits are determined for DCI with K number of G-RNTIs of interested TMGIs
(b). UE applies the interest indication in next Nth period after sending the interest indication or receiving ACK to the interest indication. For example, if ACK to the interest indication is received on a slot in SFN=20, the number of HARQ-ACK information bits is determined based on the interest indication after the beginning of SFN=22 (or in a next Nth slot after the slot)
2). 2-2B: BS updates M G-RNTI list or the number of HARQ-ACK information bits for a particular UE based on interest indication by UE specific DCI or MAC CE or RRC message. Upon receiving the update from BS or upon sending ACK to the update to BS, UE determines the number of HARQ-ACK information bits based on the update.
(a). The number of HARQ-ACK information bits is determined as indicated by BS.
i. For example, one HARQ-ACK information bit is determined for DCI with an G-RNTI of an interested TMGI(s)
ii. For example, K HARQ-ACK information bits are determined for DCI with K number of G-RNTIs of interested TMGIs Method 3: Concatenation of Harq-ACK Sub-Codebook for Unicast Pdsch & Harq-ACK Sub-Codebook for PTM/PTP MBS Pdsch
G. For reception of multiple multicast PDSCH transmissions of different TBs, UE constructs common codebook for those multiple multicast PDSCH transmissions according to one of the following order.
Ordering HARQ-ACK information bits in an increasing or decreasing order of the G-RNTI value or in an increasing or decreasing order of RRC configured G-RNTI list (e.g. based on the interest indication sent by UE or reconfiguration sent by BS)
Ordering HARQ-ACK information bits in an increasing or decreasing order of the TMGI value or in an increasing or decreasing order of RRC configured TMGI list (e.g. based on the interest indication sent by UE or reconfiguration sent by BS)
H. For reception of multiple multicast PDSCH transmissions of different TBs, UE constructs separate sub-codebooks individually for those multiple multicast PDSCH transmissions and concatenate separate sub-codebooks into a HARQ-ACK codebook in one of the following order.
an increasing or decreasing order of the G-RNTI value or in an increasing or decreasing order of RRC configured G-RNTI list (e.g. based on the interest indication sent by UE or reconfiguration sent by BS)
an increasing or decreasing order of the TMGI value or in an increasing or decreasing order of RRC configured TMGI list (e.g. based on the interest indication sent by UE or reconfiguration sent by BS)

from lowest priority of PDSCH reception to highest priority of PDSCH reception in an increasing order of priority of PDSCH receptions from highest priority of PDSCH reception to lowest priority of PDSCH reception in an decreasing order of priority of PDSCH receptions I. For reception of multicast PDSCH transmission and unicast PDSCH transmission, UE constructs separate sub-codebooks individually for those PDSCH transmissions and concatenate separate sub-codebooks into a HARQ-ACK codebook in one of the following order.

Sub-codebook for unicast PDSCH is followed by sub-codebook for PTM/PTP MBS PDSCH.
1. For sub-codebook for PTM/PTP MBS PDSCH, PTM PDSCH is followed by PTP MBS PDSCH.
2. For sub-codebook for PTM/PTP MBS PDSCH, PTP PDSCH is followed by PTM MBS PDSCH.

Sub-codebook for PTM/PTP MBS PDSCH is followed by sub-codebook for unicast PDSCH.
  1). For sub-codebook for PTM/PTP MBS PDSCH, PTM PDSCH is followed by PTP MBS PDSCH.
  2). For sub-codebook for PTM/PTP MBS PDSCH, PTP PDSCH is followed by PTM MBS PDSCH.

Sub-codebook for unicast PDSCH and PTM MBS PDSCH is followed by sub-codebook for PTM MBS PDSCH.
  1). For sub-codebook for unicast PDSCH and PTP MBS PDSCH, unicast PDSCH is followed by PTP MBS PDSCH.
  2). For sub-codebook for unicast PDSCH and PTP MBS PDSCH, PTP MBS PDSCH is followed by unicast PDSCH.

Sub-codebook for PTM MBS PDSCH is followed by sub-codebook for unicast PDSCH and PTM MBS PDSCH.
  1). For sub-codebook for unicast PDSCH and PTP MBS PDSCH, unicast PDSCH is followed by PTP MBS PDSCH.
  2). For sub-codebook for unicast PDSCH and PTP MBS PDSCH, PTP MBS PDSCH is followed by unicast PDSCH.

Sub-codebook for PTM MBS PDSCH is followed by sub-codebook for unicast PDSCH.

Sub-codebook for PTP MBS PDSCH is followed by sub-codebook for unicast PDSCH.

Sub-codebook for unicast PDSCH is followed by sub-codebook for PTM MBS PDSCH

Sub-codebook for unicast PDSCH is followed by sub-codebook for PTP MBS PDSCH

J. For group common SPS configuration(s), HARQ-ACK to Group common SPS configuration can be constructed as a separate HARQ-ACK sub-codebook which can be concatenated as follows in one of the above orders of the HARQ-ACK codebook:

Right before or after the sub-codebook for unicast PDSCH

Right before or after the sub-codebook for PTM MBS PDSCH

Right before or after the sub-codebook for PTP MBS PDSCH

Right before or after the sub-codebook for UE specific SPS configuration(s)

At the end of all other sub-codebooks

At the beginning of all other sub-codebooks.

K. For UE specific SPS configuration(s) for unicast or multicast, HARQ-ACK to UE specific SPS configuration can be constructed as a separate HARQ-ACK sub-codebook which can be concatenated as follows in one of the above orders of the HARQ-ACK codebook:

Right before or after the sub-codebook for unicast PDSCH

Right before or after the Sub-codebook for PTM MBS PDSCH

Right before or after the Sub-codebook for PTP MBS PDSCH

Right before or after the sub-codebook for group common SPS configuration(s)

At the end of all other sub-codebooks

At the beginning of all other sub-codebooks.

L. Unicast PDSCH, PTM/PTP MBS PDSCH and group common SPS may be transmitted/received in a same (sub-)slot or different (sub-)slots based on FDM/TDM/SDM method.

M. (sub-)codebook may be configured based on a specific type for example, type-1, type-2, type-3 codebook etc.

Method 4: Pucch Resource Allocation

N. When UE receives PTP MBS PDSCH transmission, the PUCCH resource indicator and the PDSCH-to-HARQ_feedback timing indicator in UE specific DCI are interpreted based on PUCCH-config configured for unicast by a RRC message, regardless of whether PUCCH-config configured for multicast is configured or not by a RRC message O. UE specific PUCCH resources are configured on UE's active BWP which may or may not be overlapped with a CFR associated to the UE's active BWP.

P. Group common PUCCH resources are configured on a CFR configured within UE's active UL BWP associated to the CFR.

11. Upon receiving the NACK with a TCI state, BS may retransmit PDCCH and PDSCH with the TCI state in the configured DL CFR for retransmission of the TB. UE monitors group common and/or UE specific PDCCH with the TCI state on the configured search space in the DL CFR to receive a retransmission of the TB.

BS can retransmit the TB to only one of the UEs in the group by UE specific PDCCH while other UEs do not receive the retransmission of the TB e.g. because they have successfully received the TB.

12. If UE receives the PDCCH for the retransmission of the TB, UE receives PDSCH scheduled by the DCI of the PDCCH.

If UE successfully decodes the TB on the PDSCH, UE considers that the decoded TB is associated to MTCH, MRB, TMGI, G-RNTI and/or short ID of the MBS service, based on mapping between MBS services and HPNs (HARQ Process Numbers) indicated by the DCI, and/or mapping between MBS services and, if available, short ID(s) indicated by the DCI.

13. If decoding the TB on the PDSCH transmission occasion is successful, UE sends HARQ ACK to BS on a PUCCH resource in the configured UL CFR according to PUCCH configuration received by the RRC message, and PUCCH resource indicator and PDSCH-to-HARQ_feedback timing indicator received by the retransmission DCI.

14. BS may activate and/or deactivate one or more TCI states for G-RNTI or the CFR or the UE by sending TCI State Indication for Group Common MAC CE or for UE specific MAC CE. Upon receiving the MAC CE, UE activates and/or deactivate the TCI state(s) indicated by the MAC CE for reception of group common PDCCH and/or group common PDSCH for the G-RNTI or the CFR indicated by the MAC CE.

15. If BS changes mapping between MBS services and HPNs (HARQ Process Numbers), and/or mapping between MBS services and, if available, short ID(s), BS can inform UE about changed mapping by sending a RRC message or a group common MAC CE (for change of group common mapping) or a UE specific MAC CE (for change of UE specific mapping).

According to an embodiment of the present invention, the UE may selectively receive the dynamic scheduled UE-group PDCCHs/PDSCHs, and thus the UE may receive the PDCCHs/PDSCHs based on an optimal TCI state.

Figure 11:
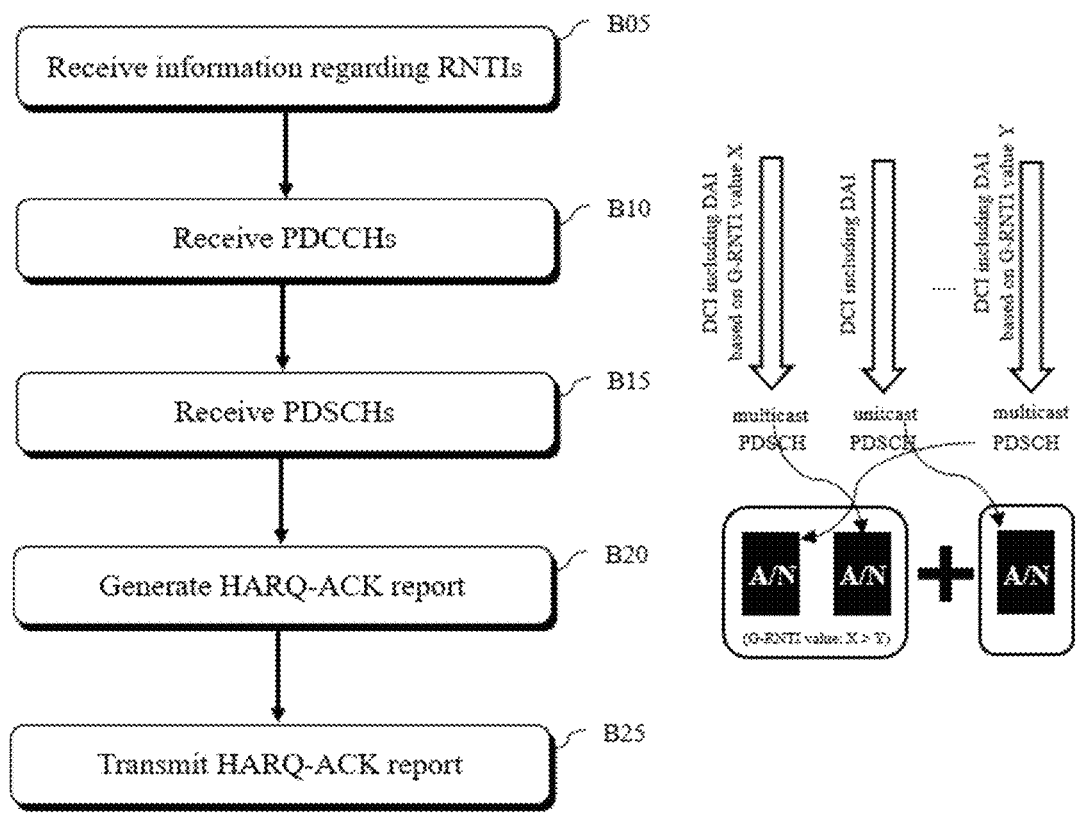
FIGS. 11 and 12 illustrate signal transmission and reception flows according to embodiments of the present disclosure.

FIG. 11 is a diagram for explaining operations of a UE according to an embodiment of the present disclosure. FIG. 11 is a particular implementation of the above-described examples, and thus the scope of the present disclosure is not limited to FIG. 11. The details described above may be referred to in FIG. 11.

Referring to FIG. 11, the UE may receive (B05) information regarding a plurality of radio network temporary identifiers (RNTIs).

The UE may monitor (B10) a plurality of physical downlink control channels (PDCCHs) in search space sets based on the plurality of RNTIs.

The UE may receive (B15) a plurality of physical downlink shared channels (PDSCHs) scheduled by the plurality of PDSCHs.

The UE may generate (B20) a single hybrid automatic repeat request (HARQ)-acknowledgment (ACK) report for the plurality of PDSCHs The UE may transmit (B25) the single HARQ-ACK report.

Based on that i) the plurality of RNTIs include group-RNTIs (G-RNTIs) for multicast, ii) the plurality of PDCCHs include G-RNTI-based PDCCHs for scheduling multicast PDSCHs, iii) downlink control information (DCI) of each G-RNTI-based PDCCH includes downlink assignment index (DAI) for a corresponding multicast PDSCH, iv) the plurality of PDSCH include at least one unicast PDSCH in addition to the multicast PDSCHs, and v) the UE is configured to generate the single HARQ-ACK report based on a type-2 HARQ-ACK codebook, the generation of the single HARQ-ACK report may comprise: a) determining at least one first HARQ-ACK codebook for the at least one unicast PDSCH; b) determining second HARQ-ACK codebooks for the multicast PDSCHs; and c) generating the single HARQ-ACK report by concatenating the at least first HARQ-ACK codebook and the second HARQ-ACK codebooks based on a specific concatenation rule.

Based on the specific concatenation rule the at least first HARQ-ACK codebook for the at least one unicast PDSCH may be followed by the second HARQ-ACK codebooks for the multicast PDSCHs, and the second HARQ-ACK codebooks for the multicast PDSCHs may be arranged based on the G-RNTIs.

Preferably, the second HARQ-ACK codebooks for the multicast PDSCHs may be arranged in ascending order of the G-RNTIs.

Preferably, the at least one unicast PDSCH may include a unicast PDSCH carrying a retransmission of a multicast TB.

Preferably, an ACK/Negative-ACK (NACK) bit for the retransmission of the multicast TB may be included in the at least one first HARQ-ACK codebook.

Preferably, based on the single HARQ-ACK report includes Negative-ACK (NACK) for a corresponding multicast PDSCH, the UE may assume that a retransmission of the corresponding multicast PDSCH can be scheduled either a unicast PDCCH or a same G-RNTI-based PDCCH.

Preferably, DAI value counting may be performed per each G-RNTI.

Preferably, a size of the second HARQ-ACK codebooks for the multicast PDSCHs may be determined based on DAIs included in the G-RNTI-based PDCCHs.

Preferably, in a state where a size of the single HARQ-ACK report is limited by a maximum payload size, the at least first HARQ-ACK codebook may be prioritized over all the second HARQ-ACK codebooks.

Preferably, among the second HARQ-ACK codebooks for the multicast PDSCHs, a second HARQ-ACK codebook related to a lower G-RNTI value may be prioritized over a second HARQ-ACK codebook related to a higher G-RNTI value.

Figure 12:
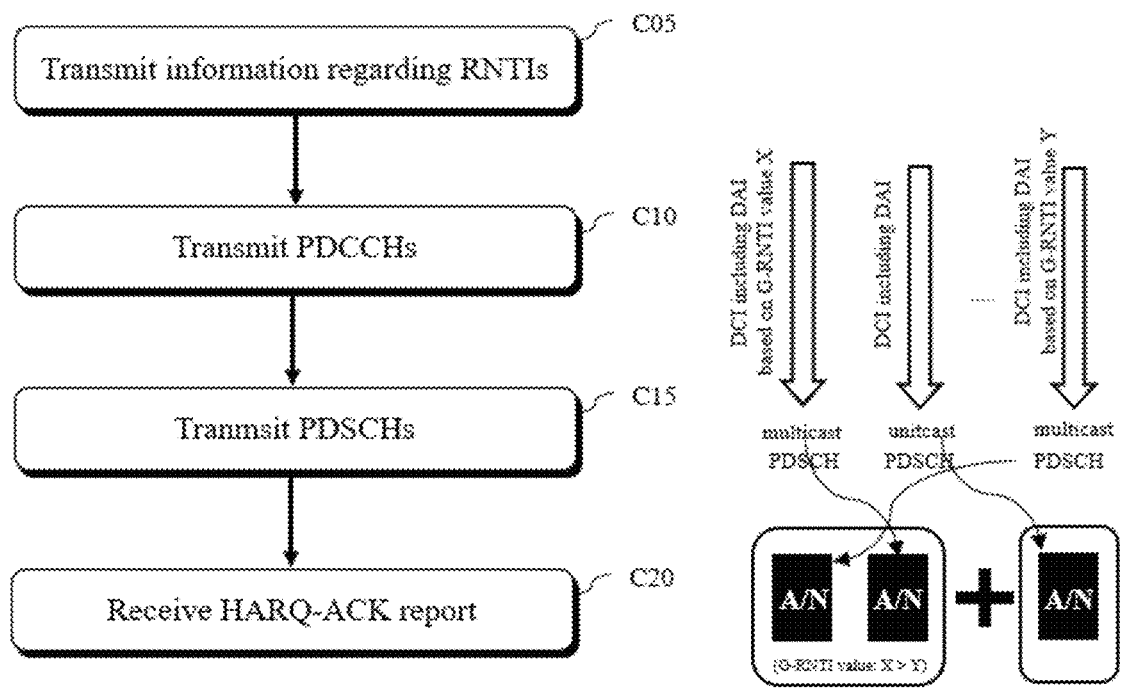

FIG. 12 is a diagram for explaining operations of a BS according to an embodiment of the present disclosure. FIG. 12 is a particular implementation of the above-described examples, and thus the scope of the present disclosure is not limited to FIG. 12. The details described above may be referred to in FIG. 12.

Referring to FIG. 12, the BS may transmit (C05) information regarding a plurality of radio network temporary identifiers (RNTIs).

The BS may transmit (C10) a plurality of physical downlink control channels (PDCCHs) in search space sets based on the plurality of RNTIs.

The BS may transmit (C15) a plurality of physical downlink shared channels (PDSCHs) scheduled by the plurality of PDSCHs.

The BS may receive (C20) a single hybrid automatic repeat request (HARQ)-acknowledgment (ACK) report for the plurality of PDSCHs.

Based on that i) the plurality of RNTIs include group-RNTIs (G-RNTIs) for multicast, ii) the plurality of PDCCHs include G-RNTI-based PDCCHs for scheduling multicast PDSCHs, iii) downlink control information (DCI) of each G-RNTI-based PDCCH includes downlink assignment index (DAI) for a corresponding multicast PDSCH, iv) the plurality of PDSCH include at least one unicast PDSCH in addition to the multicast PDSCHs, and v) the single HARQ-ACK report is configured based on a type-2 HARQ-ACK codebook, the reception of the single HARQ-ACK report may comprise: a) obtaining at least one first HARQ-ACK codebook for the at least one unicast PDSCH; and b) obtaining second HARQ-ACK codebooks for the multicast PDSCHs.

The at least first HARQ-ACK codebook and the second HARQ-ACK codebooks may be concatenated based on a specific concatenation rule.

Based on the specific concatenation rule, the at least first HARQ-ACK codebook for the at least one unicast PDSCH is followed by the second HARQ-ACK codebooks for the multicast PDSCHs, and the second HARQ-ACK codebooks for the multicast PDSCHs are arranged based on the G-RNTIs.

The various details, functions, procedures, proposals, methods, and/or operational flowcharts described in this document may be applied to a variety of fields that require wireless communication/connections (e.g., 5G) between devices.

Hereinafter, a description will be given in detail with reference to the drawings. In the following drawings/descriptions, the same reference numerals may denote the same or corresponding hardware blocks, software blocks, or functional blocks unless specified otherwise.

Figure 13:
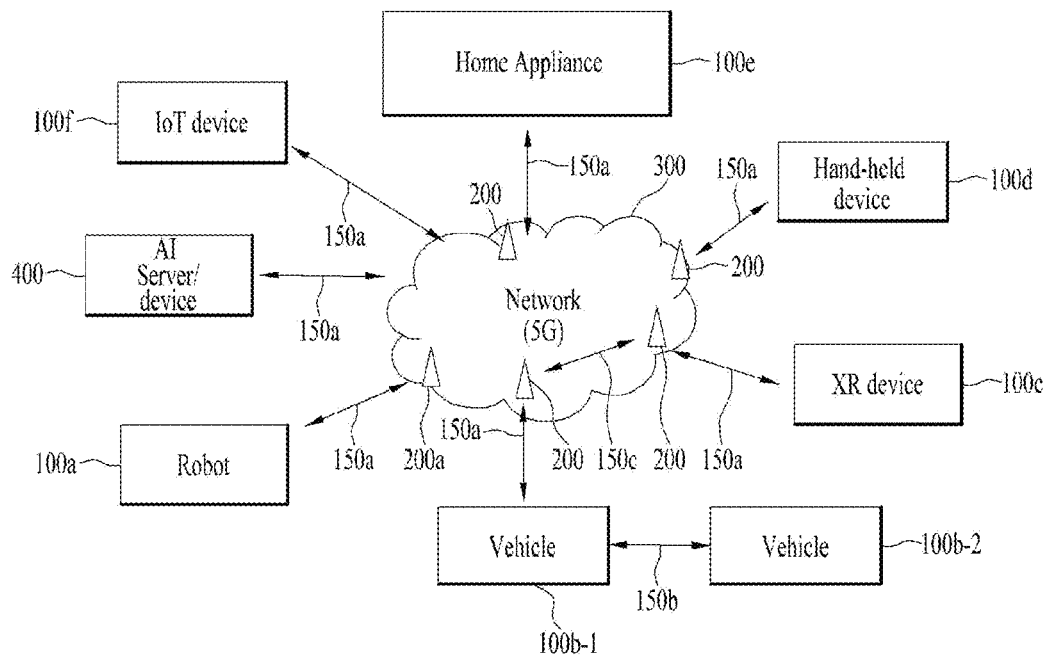
FIGS. 13 to 16 illustrate a communication system 1 and wireless devices applicable to the present disclosure.

FIG. 13 illustrates a communication system 1 applied to the present disclosure.

Referring to FIG. 13, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 14:
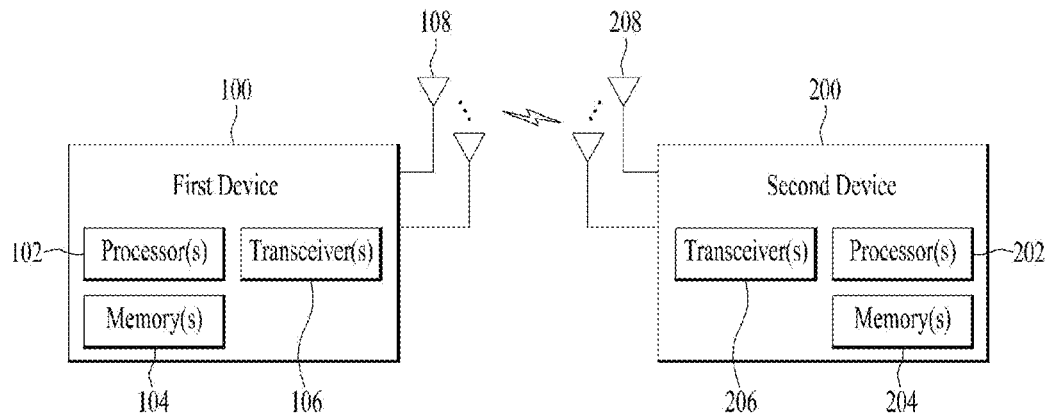

FIG. 14 illustrates wireless devices applicable to the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
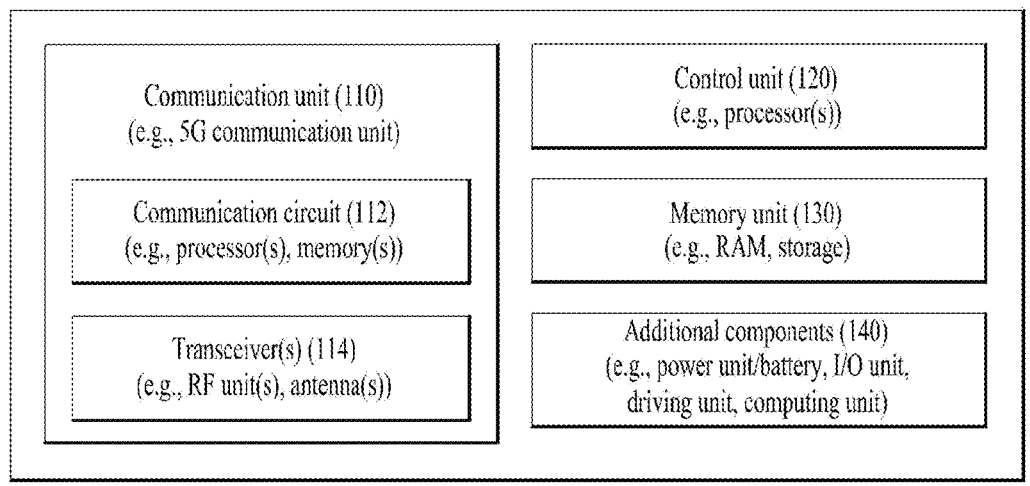

FIG. 15 illustrates another example of a wireless device applied to the present disclosure. The wireless device may be implemented in various forms according to a use-case/service (refer to FIG. 13).

Referring to FIG. 15, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 13), the vehicles (100b-1 and 100b-2 of FIG. 13), the XR device (100c of FIG. 13), the hand-held device (100d of FIG. 13), the home appliance (100e of FIG. 13), the IoT device (100f of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 16:
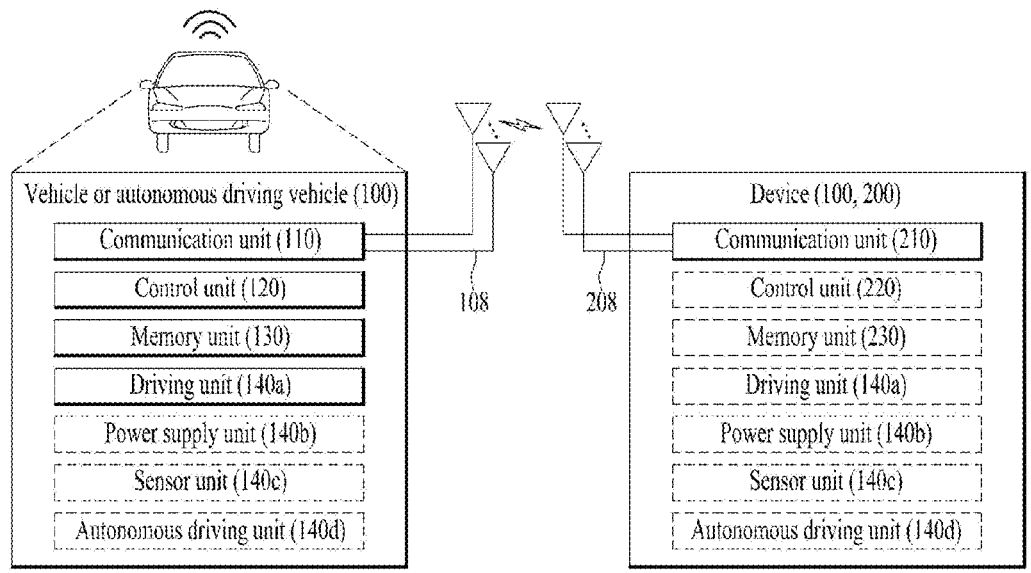

FIG. 16 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 16, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 15, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 17:
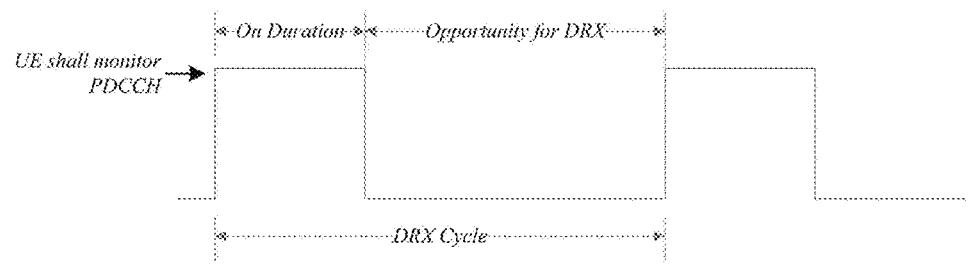
FIG. 17 illustrates discontinuous reception (DRX) operation applicable to the present disclosure.

FIG. 17 is a diagram illustrating a DRX operation of a UE according to an embodiment of the present disclosure.

The UE may perform a DRX operation in the aforedescribed/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 17, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 8 describes a DRX operation of a UE (in the RRC_CONNECTED state). Referring to Table 8, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 8

| | Type of signals | UE procedure |
|---|---|---|
| 1$^{st}$ step | RRC signalling (MAC-CellGroupConfig) | Receive DRX configuration information |
| 2$^{nd}$ Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.
  Value of drx-OnDurationTimer: defines the duration of the starting period of the DRX cycle.
  Value of drx-InactivityTimer: defines the duration of a time period during which the UE is awake after a PDCCH occasion in which a PDCCH indicating initial UL or DL data has been detected
  Value of drx-HARQ-RTT-TimerDL: defines the duration of a maximum time period until a DL retransmission is received after reception of a DL initial transmission.
  Value of drx-HARQ-RTT-TimerDL: defines the duration of a maximum time period until a grant for a UL retransmission is received after reception of a grant for a UL initial transmission.
  drx-LongCycleStartOffset: defines the duration and starting time of a DRX cycle.
  drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure is applicable to UEs, BSs, or other apparatuses in a wireless mobile communication system.

The invention claimed is:
1. A method of receiving a signal by a user equipment (UE) in a wireless communication system, the method comprising:
  receiving information regarding a plurality of radio network temporary identifiers (RNTIs);
  monitoring a plurality of physical downlink control channels (PDCCHs) in search space sets based on the plurality of RNTIs;
  receiving a plurality of physical downlink shared channels (PDSCHs) scheduled by the plurality of PDSCHs;
  generating a single hybrid automatic repeat request (HARQ)-acknowledgment (ACK) report for the plurality of PDSCHs, and
  transmitting the single HARQ-ACK report,
  wherein, based on that i) the plurality of RNTIs include group-RNTIs (G-RNTIs) for multicast, ii) the plurality of PDCCHs include G-RNTI-based PDCCHs for scheduling multicast PDSCHs, iii) downlink control information (DCI) of each G-RNTI-based PDCCH includes downlink assignment index (DAI) for a corresponding multicast PDSCH, iv) the plurality of PDSCH include at least one unicast PDSCH in addition to the multicast PDSCHs, and v) the UE is configured to generate the single HARQ-ACK report based on a type-2 HARQ-ACK codebook, the generation of the single HARQ-ACK report comprises:
    a) determining at least one first HARQ-ACK codebook for the at least one unicast PDSCH;
    b) determining second HARQ-ACK codebooks for the multicast PDSCHs; and c) generating the single HARQ-ACK report by concatenating the at least first HARQ-ACK codebook and the second HARQ-ACK codebooks based on a specific concatenation rule, wherein, based on the specific concatenation rule:
the at least first HARQ-ACK codebook for the at least one unicast PDSCH is followed by the second HARQ-ACK codebooks for the multicast PDSCHs, and the second HARQ-ACK codebooks for the multicast PDSCHs are arranged based on the G-RNTIs.

2. The method according to claim 1, wherein the second HARQ-ACK codebooks for the multicast PDSCHs are arranged in ascending order of the G-RNTIs.

3. The method according to claim 1, wherein the at least one unicast PDSCH includes a unicast PDSCH carrying a retransmission of a multicast TB.

4. The method according to claim 3, wherein an ACK/Negative-ACK (NACK) bit for the retransmission of the multicast TB is included in the at least one first HARQ-ACK codebook.

5. The method according to claim 1, wherein based on the single HARQ-ACK report includes Negative-ACK (NACK) for a corresponding multicast PDSCH, the UE assumes that a retransmission of the corresponding multicast PDSCH can be scheduled either a unicast PDCCH or a same G-RNTI-based PDCCH.

6. The method according to claim 1, wherein DAI value counting is performed per each G-RNTI.

7. The method according to claim 1, wherein a size of the second HARQ-ACK codebooks for the multicast PDSCHs are determined based on DAIS included in the G-RNTI-based PDCCHs.

8. The method according to claim 1, wherein in a state where a size of the single HARQ-ACK report is limited by a maximum payload size, the at least first HARQ-ACK codebook is prioritized over all the second HARQ-ACK codebooks.

9. The method according to claim 8, wherein, among the second HARQ-ACK codebooks for the multicast PDSCHs, a second HARQ-ACK codebook related to a lower G-RNTI value is prioritized over a second HARQ-ACK codebook related to a higher G-RNTI value.

10. A non-transitory computer-readable medium storing a program for executing the method of claim 1.

11. A device for wireless communication, the device comprising:
a memory configured to store instructions; and
a processor configured to perform operations by executing the instructions,
wherein the operations performed by the processor comprise:
receiving information regarding a plurality of radio network temporary identifiers (RNTIs);
monitoring a plurality of physical downlink control channels (PDCCHs) in search space sets based on the plurality of RNTIs;
receiving a plurality of physical downlink shared channels (PDSCHs) scheduled by the plurality of PDSCHs;
generating a single hybrid automatic repeat request (HARQ)-acknowledgment (ACK) report for the plurality of PDSCHs, and
transmitting the single HARQ-ACK report,
wherein, based on that i) the plurality of RNTIs include group-RNTIs (G-RNTIs) for multicast, ii) the plurality of PDCCHs include G-RNTI-based PDCCHs for scheduling multicast PDSCHs, iii) downlink control information (DCI) of each G-RNTI-based PDCCH includes downlink assignment index (DAI) for a corresponding multicast PDSCH, iv) the plurality of PDSCH include at least one unicast PDSCH in addition to the multicast PDSCHs, and v) the processor is configured to generate the single HARQ-ACK report based on a type-2 HARQ-ACK codebook, the generation of the single HARQ-ACK report comprises:
a) determining at least one first HARQ-ACK codebook for the at least one unicast PDSCH;
b) determining second HARQ-ACK codebooks for the multicast PDSCHs; and
c) generating the single HARQ-ACK report by concatenating the at least first HARQ-ACK codebook and the second HARQ-ACK codebooks based on a specific concatenation rule,
wherein, based on the specific concatenation rule:
the at least first HARQ-ACK codebook for the at least one unicast PDSCH is followed by the second HARQ-ACK codebooks for the multicast PDSCHs, and
the second HARQ-ACK codebooks for the multicast PDSCHs are arranged based on the G-RNTIs.

12. The device of claim 11, wherein the device is an application-specific integrated circuit (ASIC) or a digital signal processor.

13. The device of claim 11, wherein the device is a user equipment (UE) operating in a 3rd generation partnership project (3GPP) based wireless communication system.

14. A method of transmitting a signal by a base station (BS) in a wireless communication system, the method comprising:
transmitting information regarding a plurality of radio network temporary identifiers (RNTIs);
transmitting a plurality of physical downlink control channels (PDCCHs) in search space sets based on the plurality of RNTIs;
transmitting a plurality of physical downlink shared channels (PDSCHs) scheduled by the plurality of PDSCHs; and
receiving a single hybrid automatic repeat request (HARQ)-acknowledgment (ACK) report for the plurality of PDSCHs,
wherein, based on that i) the plurality of RNTIs include group-RNTIs (G-RNTIs) for multicast, ii) the plurality of PDCCHs include G-RNTI-based PDCCHs for scheduling multicast PDSCHs, iii) downlink control information (DCI) of each G-RNTI-based PDCCH includes downlink assignment index (DAI) for a corresponding multicast PDSCH, iv) the plurality of PDSCH include at least one unicast PDSCH in addition to the multicast PDSCHs, and v) the single HARQ-ACK report is configured based on a type-2 HARQ-ACK codebook, the reception of the single HARQ-ACK report comprises:
a) obtaining at least one first HARQ-ACK codebook for the at least one unicast PDSCH; and
b) obtaining second HARQ-ACK codebooks for the multicast PDSCHs; and
wherein the at least first HARQ-ACK codebook and the second HARQ-ACK codebooks are concatenated based on a specific concatenation rule,
wherein, based on the specific concatenation rule:
the at least first HARQ-ACK codebook for the at least one unicast PDSCH is followed by the second HARQ-ACK codebooks for the multicast PDSCHs, and the second HARQ-ACK codebooks for the multicast PDSCHs are arranged based on the G-RNTIs.

15. A base station (BS) for wireless communication, the BS comprising:
   a transceiver; and
   a processor configured to control the transceiver to:
   transmit information regarding a plurality of radio network temporary identifiers (RNTIs);
   transmit a plurality of physical downlink control channels (PDCCHs) in search space sets based on the plurality of RNTIs;
   transmit a plurality of physical downlink shared channels (PDSCHs) scheduled by the plurality of PDCCHs; and
   receive a single hybrid automatic repeat request (HARQ)-acknowledgment (ACK) report for the plurality of PDSCHs,
   wherein, based on that i) the plurality of RNTIs include group-RNTIs (G-RNTIs) for multicast, ii) the plurality of PDCCHs include G-RNTI-based PDCCHs for scheduling multicast PDSCHs, iii) downlink control information (DCI) of each G-RNTI-based PDCCH includes downlink assignment index (DAI) for a corresponding multicast PDSCH, iv) the plurality of PDSCH include at least one unicast PDSCH in addition to the multicast PDSCHs, and v) the single HARQ-ACK report is configured based on a type-2 HARQ-ACK codebook, the reception of the single HARQ-ACK report comprises:
   a) obtaining at least one first HARQ-ACK codebook for the at least one unicast PDSCH; and
   b) obtaining second HARQ-ACK codebooks for the multicast PDSCHs; and
   wherein the at least first HARQ-ACK codebook and the second HARQ-ACK codebooks are concatenated based on a specific concatenation rule,
   wherein, based on the specific concatenation rule:
   the at least first HARQ-ACK codebook for the at least one unicast PDSCH is followed by the second HARQ-ACK codebooks for the multicast PDSCHs, and
   the second HARQ-ACK codebooks for the multicast PDSCHs are arranged based on the G-RNTIs.

* * * * *

UNITED STATES PATENT AND TRADEMARK OFFICE
CERTIFICATE OF CORRECTION

| | | |
|---|---|---|
| PATENT NO. | : 12,107,688 B2 | Page 1 of 1 |
| APPLICATION NO. | : 17/714560 | |
| DATED | : October 1, 2024 | |
| INVENTOR(S) | : Youngdae Lee, Suckchel Yang and Seonwook Kim | |

It is certified that error appears in the above-identified patent and that said Letters Patent is hereby corrected as shown below:

In the Claims

Column 38, Line 47; In Claim 1, after "plurality of" delete ""PDSCHs"" and insert -- "PDCCHs" -- therefor.

Column 38, Line 59; In Claim 1, delete ""PDSCH"" and insert -- "PDSCHs" -- therefor.

Column 39, Line 59; In Claim 11, after "plurality of" delete ""PDSCHs"" and insert -- "PDCCHs" -- therefor.

Column 40, Line 4; In Claim 11, delete ""PDSCH"" and insert -- "PDSCHs" -- therefor.

Column 40, Line 39; In Claim 14, after "plurality of" delete ""PDSCHs"" and insert -- "PDCCHs" -- therefor.

Column 40, Line 51; In Claim 14, delete ""PDSCH"" and insert -- "PDSCHs" -- therefor.

Column 41, Line 13; In Claim 15, after "plurality of" delete ""PDSCHs"" and insert -- "PDCCHs" -- therefor.

Column 42, Line 2; In Claim 15, delete ""PDSCH"" and insert -- "PDSCHs" -- therefor.

Signed and Sealed this
Twentieth Day of May, 2025

Coke Morgan Stewart
*Acting Director of the United States Patent and Trademark Office*